(12) United States Patent
Wilcox

(10) Patent No.: US 12,400,405 B2
(45) Date of Patent: Aug. 26, 2025

(54) METHOD FOR GENERATING INSTRUCTIONS FOR FABRICATING A GARMENT

(71) Applicant: Clothing Tech LLC, Austin, TX (US)

(72) Inventor: William Wilcox, Austin, TX (US)

(73) Assignee: CLOTHING TECH LLC, Austin, TX (US)

( * ) Notice: Subject to any disclaimer, the term of this patent is extended or adjusted under 35 U.S.C. 154(b) by 210 days.

(21) Appl. No.: 18/125,032

(22) Filed: Mar. 22, 2023

(65) Prior Publication Data

US 2023/0298273 A1    Sep. 21, 2023

Related U.S. Application Data

(63) Continuation-in-part of application No. 17/393,849, filed on Aug. 4, 2021, now abandoned, which is a
(Continued)

(51) Int. Cl.
*G06T 19/00* (2011.01)
*A41H 1/00* (2006.01)
(Continued)

(52) U.S. Cl.
CPC .............. *G06T 19/00* (2013.01); *A41H 1/00* (2013.01); *G06F 30/10* (2020.01); *G06N 5/04* (2013.01);
(Continued)

(58) Field of Classification Search
None
See application file for complete search history.

(56) References Cited

U.S. PATENT DOCUMENTS

| 4,926,344 A | 5/1990 | Collins et al. |
| 10,229,228 B2 | 3/2019 | Belmans et al. |

(Continued)

FOREIGN PATENT DOCUMENTS

| CN | 101364308 A | 2/2009 |
| CN | 101398942 A | 4/2009 |

(Continued)

OTHER PUBLICATIONS

Park et al., "3D Simulation Technology as an Effective Instructional Tool for Enhancing Spatial Visualization Skills in Apparel Design" (Year: 2011).*

(Continued)

*Primary Examiner* — Hilina K Demeter
(74) *Attorney, Agent, or Firm* — Maschoff Brennan

(57) ABSTRACT

An improved method for fabricating a user-generated garment. In one embodiment, garment data related to a predefined or default garment is received, shape and finish pieces of the garment are separated, a template for each shape piece is selected that comprises information about a position and orientation relative to a human body, the shape pieces are assembled in 3D, a finish macro for each finish piece is selected that comprises assembling instructions for assembling the finish piece to the assembled shape pieces, a preliminary 3D garment is visualized on an avatar in a graphical user interface, a garment adjustment process is performed using the graphical user interface to generate a user-generated garment, and fabrication instructions for fabricating the user-generated garment are generated.

26 Claims, 12 Drawing Sheets

Related U.S. Application Data continuation of application No. 16/863,773, filed on Apr. 30, 2020, now Pat. No. 11,676,341.

(51) Int. Cl.
  *G06F 30/10*    (2020.01)
  *G06N 5/04*     (2023.01)
  *G06N 20/00*    (2019.01)
  *G06Q 10/10*    (2023.01)
  *G06Q 30/0203*  (2023.01)
  *G06Q 30/0601*  (2023.01)

(52) U.S. Cl.
  CPC ............ *G06N 20/00* (2019.01); *G06Q 10/10* (2013.01); *G06Q 30/0203* (2013.01); *G06Q 30/0643* (2013.01)

(56) References Cited

U.S. PATENT DOCUMENTS

| | | | |
|---|---|---|---|
| 10,460,525 | B1 | 10/2019 | Buuck et al. |
| 10,607,411 | B1* | 3/2020 | Pezzino ............... G06T 7/337 |
| 10,664,903 | B1* | 5/2020 | Haitani ............. G02B 27/017 |
| 10,997,778 | B2 | 5/2021 | Zhang et al. |
| 11,519,109 | B2* | 12/2022 | Resneck ................ D04B 1/24 |
| 11,530,503 | B2* | 12/2022 | Bell ................. G06Q 30/0643 |
| 2009/0222127 | A1* | 9/2009 | Lind ................. G06Q 30/0601 705/26.1 |
| 2015/0134302 | A1 | 5/2015 | Chhugani et al. |
| 2016/0073743 | A1 | 3/2016 | Davis et al. |
| 2017/0011551 | A1 | 1/2017 | Jeong et al. |
| 2017/0105468 | A1 | 4/2017 | Ngo Ngoc et al. |
| 2017/0258164 | A1 | 9/2017 | Barnet et al. |
| 2017/0351323 | A1* | 12/2017 | Colaianni ............. G06F 3/0325 |
| 2018/0012420 | A1 | 1/2018 | Ngo Ngoc et al. |
| 2018/0087196 | A1* | 3/2018 | Jeon ...................... G06T 11/00 |
| 2018/0197331 | A1 | 7/2018 | Chen et al. |
| 2019/0130649 | A1* | 5/2019 | O'Brien ............... G06T 15/005 |
| 2019/0261717 | A1 | 8/2019 | Schultz et al. |
| 2020/0027155 | A1 | 1/2020 | Frakes et al. |
| 2020/0063308 | A1 | 2/2020 | Schultz et al. |
| 2020/0074521 | A1 | 3/2020 | Newbury et al. |
| 2020/0090402 | A1* | 3/2020 | Su ......................... G06T 19/20 |
| 2020/0126316 | A1 | 4/2020 | Sharma et al. |
| 2020/0151807 | A1 | 5/2020 | Zhou et al. |
| 2020/0380333 | A1* | 12/2020 | Sareen .................. G06N 3/006 |
| 2021/0217237 | A1* | 7/2021 | Lee ........................ G06T 17/20 |

FOREIGN PATENT DOCUMENTS

| | | | |
|---|---|---|---|
| CN | 104239601 | A | 12/2014 |
| CN | 104933757 | A | 9/2015 |
| CN | 107958488 | A | 4/2018 |
| CN | 108292447 | A | 7/2018 |
| CN | 109166172 | A | 1/2019 |
| EP | 3156976 | A1 | 4/2017 |
| EP | 3905206 | A1 | 11/2021 |
| JP | 2009145959 | A | 7/2009 |
| WO | 02/057964 | A2 | 7/2002 |
| WO | 2018/182938 | A1 | 10/2018 |

OTHER PUBLICATIONS

Bartle et al., "Physics-driven Pattern Adjustment for Direct 3D Garment Editing" (Year: 2016).*
CN Search Report dated Aug. 7, 2024 in application 202110441418.6.
Lingsong, Zhao, "3DS Max Model and Material Rendering Application Techniques", China Railway Publishing House, 1st edition, Nov. 2007, ISBN: 978-7-113-08275-8/TP2.
CN Office Action dated Oct. 10, 2023 as received in Application No. 202110441418.6.
Durupinar et al., "A Virtual Garment Design and Simulation System" Aug. 2007.
US office action dated Aug. 30, 2023 as received in U.S. Appl. No. 17/393,849.
Final office action for U.S. Appl. No. 17/393,849 mailed on Apr. 28, 2023, 28 pages.
CN Office Action dated Apr. 3, 2024 as received in Application No. 202110441418.6.
Fabio Daolio, "Deep learning for fashion attributes", ASOS Tech Blog, Retrieved from the Internet URL: https://medium.com/asos-techblog/deep-learning-for-fashion-attributes-763c8c95034c, Sep. 6, 2018, 9 pages.
Donati et al., "Fashion Product Classification through Deep Learning and Computer Vision", Applied Sciences, vol. 9, No. 7, Retrieved from the Internet URL: https://www.mdpi.com/2076-3417/9/7/1385>, Apr. 2, 2019, 22 pages.
Extended European Search Report for EP Application No. 22186426 mailed on Jun. 7, 2023, 27 pages.
US Office Action dated Jun. 21, 2024 in U.S. Appl. No. 17/393,849.
Fontana et al., "3D Virtual Apparel Design for Industrial Applications", 2004.
Huang, H et al., "Development of 2D block patterns from fit feature-aligned flattenable 3D garments," The Hong Kong Polytechnic University (Feb. 2011).
Extended European Search Report dated Sep. 22, 2021 as received in Application No. 21170715.3.
EP Office Action dated May 8, 2025 as received in Application No. 21170715.3.

* cited by examiner

FIG. 6
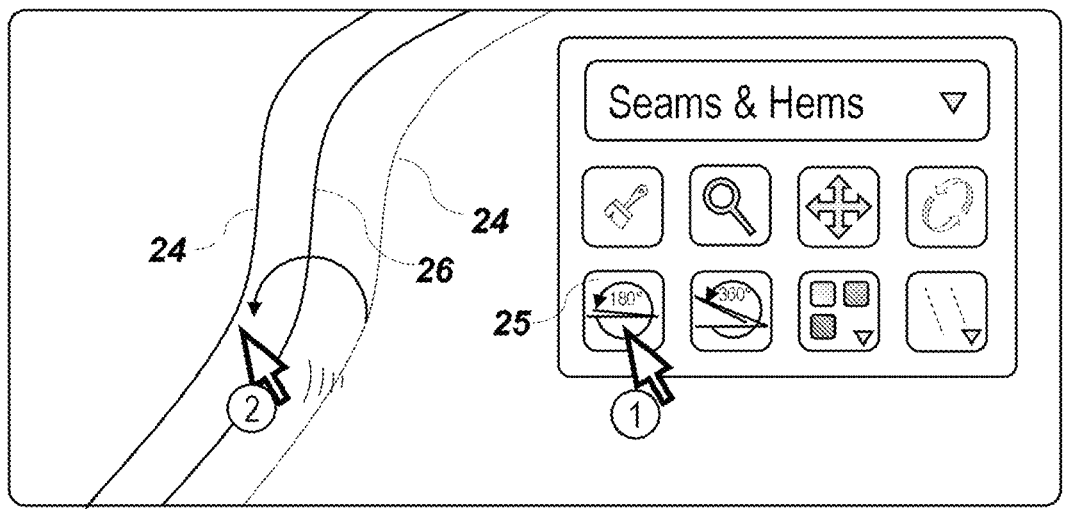
FIG. 7
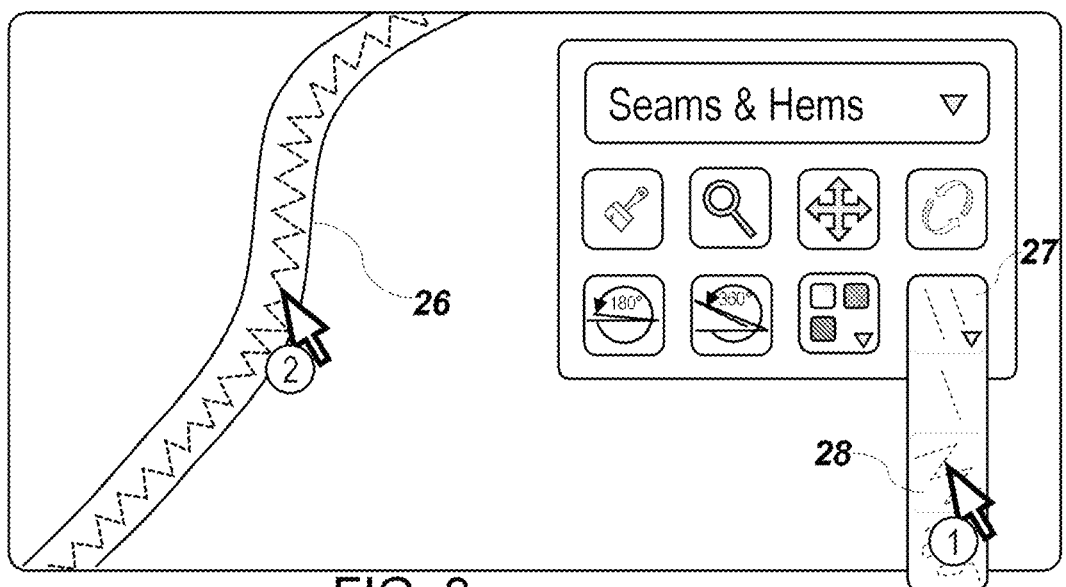
FIG. 8
FIG. 9
FIG. 10

METHOD FOR GENERATING INSTRUCTIONS FOR FABRICATING A GARMENT

CROSS-REFERENCE TO RELATED APPLICATIONS

This application claims priority as a continuation-in-part to U.S. patent application Ser. No. 17/393,849 filed Aug. 4, 2021, which claims priority to U.S. patent application Ser. No. 16/863,773, filed Apr. 30, 2020. The contents of each of these patent applications are hereby incorporated herein by reference in its entirety and for all purposes.

FIELD OF THE INVENTION

The present invention generally relates to generating 3D garment models at least in part. Specifically, the present invention pertains to a computer-implemented method for generating instructions for fabricating a user-generated garment, wherein a preliminary garment is virtually assembled using a trained recognition algorithm and pre-defined templates and macros, wherein the preliminary garment is modified based on user input in a graphical user interface and fabrication instructions for the modified garment are generated.

BACKGROUND OF THE INVENTION

In the garment industry, it is a common process to import a garment pattern, i.e. a collection of 2D drawings of the panels of the garment, into a Computer Aided Design (CAD) program on a computer in order to manually assemble the garment with a computer mouse. Each piece is dragged over an avatar and rotated and moved into roughly its correct pose on the avatar, which can be done in 3D or in a 2D projection of the avatar. After the pieces are roughly orientated and placed around the avatar, the edges where the single panels are to be connected need to be selected manually. These process steps are very tedious and take a long time.

It is also the current state of the art that the technical definition of a garment is specified in two or more documents. One document is the garment pattern as mentioned above (often a 2D CAD model in DXF format) containing the pattern shapes and used for cutting out the different garment panels from cloth that are then assembled into a garment. Another document is a file or a set of files that contain assembly instructions and other details in a human readable format such as an Excel spread sheet or a PDF file. These kind of documents defining the garment are often referred to as a "Tech Pack". The human readable instructions usually contain information about which fabric to use, what colors, what thread and stitch types, what finishes, what trims (buttons, zippers, hooks, etc.) to process, and so on. Also size measurements in a chart for the different sizes of garments to be produced may be comprised by the "Tech Pack". Contrary to the garment pattern, which depending on its file format (and whether it is digitally available at all), said assembly instructions are indeed not machine-readable because they address the human reader.

The state of the garment industry today is further that there are millions of "Tech Packs" (garment patterns and assembly instructions) but very few corresponding 3D virtual garments, which are sometimes also referred to as "Garment Digital Twins" (GDT). This is because the conversion is manual and tedious to convert from what the industry has (patterns and tech packs) into 3D models. GDT is synonymously used herein for 3D garment model.

In general, there is a desire in the industry to provide garment designers with three-dimensional models of garments so that they can check or validate the design of the garment. The garment design is a very tedious process with many iterative steps usually starting with perspective sketches and subsequent estimations of 2D pattern shapes based on experience and knowledge. A first sample is manufactured which is inspected by the designer who then corrects the garment patterns again based on his experience. A second sample verifies the changes and the process can continue like this until a garment is manufactured that meets the designer's expectations.

Furthermore, garment designers may want to update a garment design by amending an existing GDT on a three-dimensional virtual graphical user interface. It is therefore desirable to not start the design process from zero, but to have a predecessor model, e.g. a pre-season design, as a basis.

3D "Garment Digital Twins" are further of an increasing interest for the industry as they can be used to illustrate the garment, e.g. on a website, without the need for expensive and elaborate photo shootings. Once a GDT is at hand, it can be displayed in different poses, colors, sizes, and worn by different avatars or hangers. As well, the GDTs can be illustrated in a virtual fitting room where a customer can provide a three-dimensional representation of himself and virtually "try on" several different garments in different styles and sizes.

Of particular interest is the way a garment is to be finished which is defined at least by assembly steps to be applied in order to finish the garment in the desired way and optionally also by additional pieces to be connected to the garment. For example, a finish feature that does not involve an extra part would be a dart incorporated into the back of a shirt or a hem on the bottom opening of a pair of jeans, and a finish feature that does involve extra parts would be a collar with a collar stand for a shirt. These finishes are so important because they ultimately define the garment design and appearance. The designers thus spend a lot of time working on the finishes in the 3D design software to bring the finishes to perfection for every individual garment. There is therefore need for simplification and computer-based support for the generation and application of garment finishes.

OBJECT OF THE INVENTION

Therefore, the invention provides computer implemented methods that help overcoming this vast backlog demand. Methods according to the invention allow for reductions of working time and man power.

SUMMARY OF THE INVENTION

The invention pertains to a computer-implemented method for fabricating a user-generated garment, the garment comprising one or more finishes. The method comprises, automatically in a computer system: receiving garment data related to a predefined or default garment, the garment data comprising garment piece data related to a plurality of 2D garment pieces, from which the predefined or default garment is assembled; identifying, by a trained recognition algorithm of the computer system and based on the garment data, a piece type of each of the plurality of 2D garment pieces, wherein the plurality of 2D garment pieces comprising shape pieces and finish pieces, wherein the shape pieces are flat fabric pieces, together providing an overall shape of the garment when assembled, and the finish pieces comprise at least a subset of cuffs, plackets, flies, pockets, waistbands and collars; selecting, from a set of templates and based on the identified piece type, a template for each shape piece, the template assigning consistent identifiers to segments of the respective shape piece (optionally, templates with consistent identifiers are also assigned to the finish pieces), and comprising information about a position and orientation of the respective shape piece relative to a human body; 3D assembling the shape pieces using iterative proximity and the information about the position and orientation; selecting, for each of the finish pieces and based on the garment piece data, a finish macro from a library of finish macros, the finish macro comprising assembling instructions for assembling the respective finish piece to one or more 3D assembled shape pieces; visualizing, on an avatar in a graphical user interface, at least the assembled shape pieces as a preliminary 3D garment; performing a garment adjustment process that allows a user to generate a user-generated garment based on the preliminary 3D garment using the graphical user interface; and generating fabrication instructions for fabricating the user-generated garment.

According to some embodiments, the garment adjustment process comprises: receiving, via the graphical user interface, user input with modification instructions to modify the preliminary 3D garment; modifying the preliminary 3D garment based on the modification instructions; and visualizing the modified preliminary 3D garment as the user-generated garment on the avatar. According to some embodiments, modifying the preliminary 3D garment comprises: adjusting a 2D shape and/or a size of one or more of the shape pieces, joining at least one finish piece to one or more shape pieces, and 3D re-assembling of the shape pieces and finish pieces.

According to some embodiments, the modification instructions comprise a user-selection of a finish macro from the library of finish macros or from a subset of the finish macros in the library, and joining the at least one finish piece to one or more shape pieces comprises assembling the finish to one or more 3D assembled shape pieces according to the assembling instructions of the user-selected macro.

According to some embodiments, the modification instructions also relate to garment feature modifications, and modifying the 2D garment pieces based on the modification instructions comprises modifying garment features of at least one 2D garment piece, the garment features comprising a least a fabric.

According to some embodiments, the shape modifications comprise changing a garment size, and adjusting the one or more shape pieces based on the modification instructions comprises adjusting a plurality of garment pieces based on the changed garment size.

According to some embodiments, the garment adjustment process is an iterative garment adjustment process, wherein at least the steps of receiving the input and modifying the preliminary 3D garment are performed iteratively. According to some embodiments, at least the steps of receiving the input, modifying the preliminary 3D garment and visualizing the modified preliminary 3D garment are performed iteratively until a user confirmation is received via the graphical user interface, wherein the user confirmation confirms a least that the modified preliminary 3D garment is the user-generated garment to be fabricated, or that fabrication instructions should be generated based on the modified preliminary 3D garment that is visualized on the avatar.

According to some embodiments, the garment adjustment process comprises: receiving, via the graphical user interface, user input for assembling one of the finish pieces to one or more shape pieces; and 3D assembling of the finish piece according to the user input. The method then may further comprise generating, based on the user input, a new finish macro, and storing the new finish macro in the library.

According to some embodiments, the garment data comprises a garment type identifier identifying a garment type of the predefined or default garment, and 3D assembling the shape pieces is based also on the garment type. According to some embodiments, said garment type defines areas of the human body the garment is intended to cover and a plurality of openings necessary to accommodate body parts. According to some other embodiments, the garment type defines relative positions of a set of shape pieces and a plurality of openings resulting from these relative positions. In both cases, the body parts include at least one of arms, legs and neck. According to some embodiments, a list comprising a plurality of garment type identifiers for a plurality of different garment types is provided to the user, and the garment type identifier is selected from the list by the user.

According to some embodiments, the segments of the shape pieces comprise at least one of seams and sewing edges.

According to some embodiments, selecting the finish macros is based on the garment piece data and on a user-selected default.

According to some embodiments, receiving the garment data comprises loading a file into a memory of the computer system. In particular, the file may be loaded into the memory upon receiving a respective user input. For instance, the file may be a 2D CAD file or a DXF file.

According to some embodiments, the graphical user interface provides a plurality of modification instructions as user-selectable commands. The user-selectable commands relate to folding a 2D garment piece, placing a 2D garment piece next to another 2D garment piece, sewing 2D garment pieces together, cutting a 2D garment piece, and/or adding pleats to a 2D garment piece.

According to some embodiments, the method further comprises assigning one or more garment features to each of the 2D shape pieces, the garment features comprising a least a fabric, wherein the assembled shape pieces are visualized on the avatar in the graphical user interface as the preliminary 3D garment having the assigned garment features.

The fabrication instructions for fabricating the user-generated garment may be computer-readable, human-readable or both. According to some embodiments, the fabrication instructions are computer-readable instructions and the method further comprises providing the fabrication instructions to one or more garment fabrication machines, and fabricating, by the one or more garment fabrication machines, the user-generated garment based on the fabrication instructions. According to some embodiments, the fabrication instructions are human-readable instructions and the method further comprises providing the fabrication instructions to one or more garment producers, and fabricating, by the one or more garment producers, the user-generated garment based on the fabrication instructions.

According to some embodiments, the fabrication instructions comprise: user-generated garment piece data related to the plurality of 2D garment pieces of the user-generated garment; positioning data related to the relative positions of the plurality of 2D garment pieces of the user-generated garment; and sewing instructions for sewing together the plurality of 2D garment pieces of the user-generated garment, wherein the plurality of 2D garment pieces of the user-generated garment comprise shape pieces and the finish pieces. According to some embodiments, the fabrication instructions comprise instructions for at least one of fabric type, trim type, and stitch type.

According to some embodiments, the garment data comprises at least one document comprising a human-readable information describing the predefined or default garment, and the human-readable information is converted into computer-readable instructions by a trained expert system of the computer system. For instance, the human-readable information may relate to at least one of construction details, a bill of materials, a colorway, and a size chart. According to some embodiments, the human-readable information is or comprises textual information, and the trained expert system analyzes the at least one document with respect to the textual information and converts the textual information into the computer-readable instructions. According to some embodiments, the computer-readable instructions comprise a fully digital description of the predefined or default garment with respect to the 2D pattern pieces, the preliminary 3D garment and further properties of the predefined or default garment, including at least one of: stitches, seams, finishes, trims, and assembly instructions. According to some embodiments, at least one of the following method steps is based on the computer-readable instructions: identifying the piece type of each of the plurality of 2D garment pieces; 3D assembling the shape pieces based; and visualizing the preliminary 3D garment.

FURTHER ASPECTS OF THE DISCLOSURE

The invention further relates to a first computer implemented method, with program code being stored on a machine readable medium or embodied as an electromagnetic wave, for automatically generating a first 3D garment model representing a first garment to be fabricated from first garment panels, the computer implemented method comprising: (a) providing one or more first documents comprising a plurality of first 2D pattern pieces representing the first garment panels, (b) determining with a pattern recognition algorithm (i) a garment type indicator for at least one of the first 2D pattern pieces, the garment type indicator representing a type of a garment that the respective first garment panel belongs to and being one of a plurality of garment type indicators stored on the machine readable medium, and (ii) a panel pose indicator for each of the first 2D pattern pieces, the panel pose indicator representing an estimated position and an estimated orientation of the respective garment panel within the first garment, and (c) generating the first 3D garment model based on the first 2D pattern pieces, the at least one garment type indicator, and the panel pose indicators.

In an embodiment, the first computer implemented method further comprises adding default finishes to the first 3D garment model based on at least one of the at least one garment type indicator and the panel pose indicators.

In an embodiment, the first computer implemented method further comprises generating a first 2D panel model for each of the first 2D pattern pieces, wherein generating the first 3D garment model is based on draping a reference object with the first 2D panel models.

In an embodiment, the first computer implemented method further comprises: (a) positioning and orienting the first 2D panel models based on the panel pose indicators, in particular further based on a proportion of the 2D pattern pieces relative to each other, (b) while, before, or after positioning and orienting the 2D panel models, shaping each of the first 2D panel models into first 3D panel models so as they adapt to a shape of the reference object based on the at least one garment type indicator, and the panel pose indicators, and (c) generating the first 3D garment model by virtually assembling the first 3D panel models along their respective edges.

In an embodiment of the first computer implemented method, for determining a garment type indicator and the panel pose indicator, the pattern recognition algorithm is configured for analyzing at least one of (a) a shape of the 2D pattern piece, (b) a proportion of the 2D pattern piece relative to the other 2D pattern pieces, (c) textual information associated with the 2D pattern piece in the respective first document, (d) whether the 2D pattern piece is at least in part symmetrical or not, and (e) an amount of provided 2D pattern pieces.

The invention further relates to a second computer implemented method, with program code being stored on a machine readable medium or embodied as an electromagnetic wave, for virtually finishing a second 3D garment model representing a second garment to be fabricated without finishes or with default finishes, the computer implemented method comprising: (a) providing the second 3D garment model, (b) providing one or more second documents comprising human-readable garment finishing instructions for finishing the second garment, (c) determining with an extraction algorithm at least one garment finish feature from the one or more second documents, the garment finish feature corresponding to an additional garment component or a garment property and being indicative for a position and an orientation of the respective additional garment component or garment property within the second garment, and (d) virtually finishing the second 3D garment model based on the determined at least one garment finish feature.

In an embodiment of the second computer implemented method, virtually finishing the second 3D garment model comprises modifying at least a part of the second 3D garment model.

In an embodiment of the second computer implemented method, the garment finish feature corresponds to a fabric type of at least part of the second 3D garment model, wherein modifying the at least a part of the second 3D garment model comprises attributing at least one of a texture and a color to at least part of the second 3D garment model based on the garment finish feature.

In an embodiment of the second computer implemented method, the garment finish feature corresponds to seams of the second garment, wherein modifying at least a part of the second 3D garment model comprises attributing at least one of a thread color, a thread type, and a stitch pattern to seams of the second garment.

In an embodiment of the second computer implemented method, virtually finishing the second 3D garment model comprises adding at least one garment finish model to the second 3D garment model.

In an embodiment of the second computer implemented method, the garment finish feature corresponds to seams of the second garment, wherein the at least one garment finish model represents stitches to be placed at dedicated locations within the second garment.

In an embodiment of the second computer implemented method, the garment finish feature corresponds to bindings of the second garment, wherein the at least one garment finish model represents hems to be placed at openings of the second garment.

In an embodiment of the second computer implemented method, the garment finish feature corresponds to a closure of the garment, wherein the at least one garment finish model represents at least one of a button, a buttonhook, a snap fastener, a zipper, a touch fastener, a magnetic fastener, a hook, a loop for a hook or a button, a cord fastener, and laces.

In an embodiment of the second computer implemented method, for determining the at least one garment finish feature, the extraction algorithm is configured for analyzing the one or more second documents with respect to at least one of: textual information, image data, arrows, size data, color swatches, color indicators, stitch types, and stitch designations.

The invention further relates to a third computer implemented method, with program code being stored on a machine readable medium or embodied as an electromagnetic wave, for automatically generating a plurality of third 3D garment models in a batch process, each third 3D garment model representing a third garment to be fabricated from third garment panels, the computer implemented method comprising: (a) for each third 3D garment model to be generated: (i) providing one or more third documents comprising (i1) a plurality of third 2D pattern pieces representing the third garment panels and (i2) human-readable garment finishing instructions for finishing the third garment, (ii) recognizing patterns of the third 2D pattern pieces, (iii) generating a fourth 3D garment model based on the recognized patterns of third 2D pattern pieces, (iv) extracting at least one garment finish feature from the human-readable garment finishing instructions, (v) generating a third 3D garment model by virtually finishing each of the fourth 3D garment models based on the extracted at least one garment finish feature; and (b) for the batch-processed plurality of third 3D garment models, generating a report comprising statistics about at least one of: (i) whether a fourth 3D garment model could be generated for each of the third 3D garment models to be generated, (ii) which of the fourth 3D garment models could be generated, (iii) for each of the fourth 3D garment models that could be generated, a level of confidence that it was generated correctly, (iv) which of the fourth 3D garment models could not be generated, (v) which of the fourth 3D garment models could be generated only in part and to what extent, (vi) whether a third 3D garment model could be generated from each of the fourth 3D garment models, (vii) which of the third 3D garment models could be generated, (viii) for each of the third 3D garment models that could be generated, a level of confidence that it was generated correctly, (ix) which of the third 3D garment models could not be generated, and (x) which of the third 3D garment model could be generated only in part and to what extent.

In an embodiment of the third computer implemented method, recognizing patterns of the third 2D pattern pieces is based on determining with a pattern recognition algorithm (a) a garment type indicator for at least one of the third 2D pattern pieces, the garment type indicator representing a type of a garment that the respective third garment panel belongs to and being one of a plurality of garment type indicators stored on the machine readable medium, and (b) a panel pose indicator for each of the third 2D pattern pieces, the panel pose indicator representing an estimated position and an estimated orientation of the respective garment panel within the third garment, wherein generating the fourth 3D garment model is further based on the garment type indicator and the panel pose indicator.

In an embodiment of the third computer implemented method, the pattern recognition algorithm is trainable based on at least one of the generated report and user feedback.

In an embodiment of the third computer implemented method, extracting at least one garment finish feature is based on determining with an extraction algorithm the at least one garment finish feature from the one or more third documents, the garment finish feature corresponding to an additional garment component or a garment property and being indicative for a position and an orientation of the respective additional garment component or garment property within the third garment.

In an embodiment of the third computer implemented method, for determining the at least one garment finish feature, the extraction algorithm is configured for analyzing the one or more third documents with respect to at least one of: textual information, image data, arrows, size data, color swatches, color indicators, stitch types, and stitch designations.

In an embodiment of the third computer implemented method, the extraction algorithm is trainable based on at least one of the generated report and user feedback.

In other words, certain embodiments of the first, second, and third methods may be circumscribed as follows:

The first method starts by characterizing the pattern pieces, which means that it is identified 1) what the piece is, 2) where it goes on the human body (avatar) and at what rotation. Knowing what the piece is and where it goes on the avatar simplifies the next step which is to automatically assemble the garment. There are many fewer potential assembly scenarios when it is known what pieces are near what other pieces. The first method could be considered describing a trained expert system that is used to characterize the pieces. However, it is also possible to make use of an algorithmic approach that uses information such as the text on the piece, the shape of the piece, the size, whether it is symmetrical, the number of discrete segments, etc. In any case, the different shapes that belong to a garment are recognized, it is determined what each pattern piece is, and where it is located on the body. From this, the assembly of the garment into a 3D shape is automated. This 3D model may then be used to extend or amend the design with help of a Graphical User Interface (GUI).

The second method allows to look for relevant text in a document describing garment assembly instructions, e.g. a PDF, the relevant text relating to garment finishes (stitches, hems, neckline, waist, closures etc.). This information is extracted and related to a 3D garment digital twin that so far does not have finishes or only default finishes. This means that for example an Excel spreadsheet or PDF is searched for key information which are then extracted automatically and applied to the 3D digital version of the garment in the form of a garment opening (neck, sleeve, waist etc.), the colors of the garment to produce for the different pieces, the fabric type, the trims etc. Further, images, arrows, size tables, color swatches or indicators, stitch types or designations may be extracted and be converted into garment components and/or properties that can be applied to the 2D panels and/or the 3D model to produce a virtual finished garment.

The third method realizes an automated "Garment Digital Twin" (GDT) creation from a list of patterns (e.g. DXF file) and a corresponding "Tech Pack" (e.g. PDF files describing the garment in human readable form) for each of the single patterns. The GDTs are automatically created in a batch mode indicating the success or failure of each conversion. The batch processing mode comprises reading a series of documents that may be organized by garment style. Each set of documents that define a garment is read in and then converted to a 3D digital twin without the need for any user interaction. At the end, the user is provided with a report of all the garments converted and a status if the garment converted successfully and the confidence level that a correct conversion has been performed. This will allow businesses active in the garment industry to convert huge amounts of garments overnight and then edit or correct the areas where the garment conversion did not succeed.

The invention relates to a fourth computer implemented method, with program code being stored on a machine readable medium or embodied as an electromagnetic wave, for generating a garment finish preset comprising assembly instructions for a garment finish for a garment to be fabricated, the computer implemented method comprising:

providing a virtual 3D environment with a graphical user interface (GUI) configured to receive first user input, providing a plurality of design tools operatively linked with the virtual 3D environment and configured to receive second user input, based on the first and second user input, generating the garment finish preset, wherein the second user input relates to what garment finish parts are comprised by the garment finish and what assembly steps are involved in manufacturing the garment finish from the garment finish parts, and wherein the first user input relates to parametrical alterations of the garment finish parts, saving the generated garment finish preset, and rendering the garment finish preset retrievable so that it is applicable to a garment model loaded into the virtual 3D environment.

In some embodiments, the computer implemented method further comprises loading the garment model into the virtual 3D environment, retrieving the garment finish preset, and one of loading into the virtual 3D environment a set of pre-assembled garment finish parts contained by the garment finish preset, and virtually assembling the garment finish parts at a predefined or selected location within the garment model based on third user input, wherein the GUI is configured to receive the third user input, and wherein the third user input relates to where and how the garment finish parts is connected to the garment model.

In some embodiments, the computer implemented method further comprises defining panel boundary counter-parameter based on the third user input.

In some embodiments, the garment finish preset comprises representation of seams to be placed at dedicated locations within at least one of a garment finish part comprised by the garment finish preset and the garment model.

In some embodiments, the garment finish preset contains representation of hems to be placed at openings of at least one of a garment finish part comprised by the garment finish preset and the garment model.

In some embodiments, the garment finish parts comprised by the garment finish preset represent at least one of a collar, a cuff, revers, lapel, a pocket, a belt hook, and a cowl.

In some embodiments, the garment finish preset contains representation of at least one of a button, a buttonhook, a buttonhole, a button tape, a snap fastener, a zipper, a touch fastener, a magnetic fastener, a hook, a loop for a hook or a button, a cord fastener, and laces.

In some embodiments, the garment finish preset contains representation of at least one of a dart and a pleat.

In some embodiments, the computer implemented method further comprises initiating the generation of the garment finish preset by receiving an initiation input via the GUI or the design tools, wherein generating the garment finish preset is based on recording the first and second user inputs from the moment the initiation input is received, and finalizing the generation of the garment finish preset by receiving a finalization input via the GUI or the design tools, wherein recording the first and second user inputs is stopped from the moment the finalization input is received.

In some embodiments, the design tools comprise a plurality of reshaping tools configured to reshape a garment finish part.

In some embodiments, the design tools comprise a plurality of design tool selection menus.

In some embodiments, at least one of the design tool selection menus comprise one of a thread color selection menu, a stitch pattern selection menu, a size selection menu, a part selection menu, a cloth type selection menu, a cloth color selection menu, and a part style menu.

The invention further relates to a fifth computer implemented method, with program code being stored on a machine readable medium or embodied as an electromagnetic wave, for automatically generating a garment finish preset comprising assembly instructions for a garment finish for a garment to be fabricated, the computer implemented method comprising:

providing at least one document comprising at least one of a drawing and human-readable garment finishing instructions for finishing the garment, determining, with an extraction algorithm, at least one garment finish feature from the at least one document, the garment finish feature corresponding to an additional garment component or a garment property, generating a garment finish preset by translating the at least one garment finish feature into data that represent what garment finish parts are comprised by the garment finish and what assembly steps are involved in manufacturing the garment finish from the garment finish parts, saving the generated garment finish preset, and rendering the garment finish preset retrievable so that it is applicable to a garment model loaded into a virtual 3D environment.

In some embodiments, generating the garment finish preset comprises virtually assembling the garment finish parts comprised by the garment finish preset based on the determined at least one garment finish feature.

In some embodiments, the computer implemented method further comprises loading a garment model into the virtual 3D environment, retrieving the garment finish preset, and one of loading into the virtual 3D environment a set of pre-assembled garment finish parts contained by the garment finish preset, and virtually assembling the garment finish parts at a predefined or selected location within the garment model.

In some embodiments, the at least one garment finish feature is indicative for a position and an orientation of the respective additional garment component or garment property within a garment.

In some embodiments, the extraction algorithm comprises at least one of a pattern recognition algorithm and a text interpreter.

In some embodiments, the extraction algorithm is trainable based on user feedback.

In some embodiments, for determining the at least one garment finish feature, the extraction algorithm is configured for analyzing the at least one document with respect to at least one of: textual information, numerical information, image data, arrows, size data, color swatches, color indicators, stitch types, stitch designations, and a 2D/3D interpretation of the drawing.

In some embodiments, the computer implemented method further comprises determining, with the extraction algorithm, a garment type indicator from the at least one document, the garment type indicator representing a type of the garment that the garment finish belongs to and being one of a plurality of garment type indicators stored on the machine readable medium.

In some embodiments, for determining a garment type indicator, the extraction algorithm is configured for analyzing at least one of
- a shape depicted in the at least one drawing,
- a technical term contained in the human-readable garment finishing instructions, and
- at least one of textual and numerical information associated with the at least one drawing, and
- whether the garment finish parts are symmetrical or not.

The invention further relates to a sixth computer implemented method, with program code being stored on a machine readable medium or embodied as an electromagnetic wave, for automatically determining at least one candidate from a plurality of garment finish presets, each of said garment finish presets comprising assembly instructions for a garment finish for a garment to be fabricated from garment panels, the computer implemented method comprising
providing at least one of
- at least one document comprising at least one 2D pattern piece representing the garment panels and
- a 3D garment model representing the garment and comprising at least one 3D panel model;
based on at least one of said at least one 2D pattern piece, said 3D garment model, and said at least one 3D panel model, determining with an identification algorithm
- a garment type indicator representing a type of the garment and being one of a plurality of garment type indicators, and
- at least one panel type indicator representing a type of the 2D pattern piece or representing a type of the 3D panel model;
determining the at least one candidate from the plurality of garment finish presets based on the determined garment type indicator and the at least one panel type indicator.

In some embodiments, the computer implemented method further comprises analyzing at least one of the at least one 2D pattern piece, the 3D garment model, and the at least one 3D panel model with respect to boundaries to provide panel boundary parameters, wherein determining the at least one candidate from the plurality of garment finish presets is further based on the panel boundary parameters.

In some embodiments, the computer implemented method further comprises, upon a user selection of the candidate or one of the candidates, applying the according garment finish preset to the garment model or assembling the garment model based on the at least one 2D pattern piece and the according garment finish preset.

In some embodiments, the computer implemented method further comprises, upon a computer selection of the candidate or one of the candidates, applying the according garment finish preset to the garment model or assembling the garment model based on the at least one 2D pattern piece and the according garment finish preset, wherein the computer selection is subject to a suitability likelihood value determined by matching the panel boundary parameters with panel boundary counter-parameter associated with each of the plurality of garment finish presets.

In some embodiments, each of the garment finish presets comprises at least one garment finish part, and wherein applying or assembling comprises at least one of resizing and reshaping the at least one garment finish part of the selected candidate such that the resized at least one garment finish part is adapted to at least one of a shape and a size of the garment model.

In some embodiments, each of the garment finish presets has at least one tag indicative for a requirement or suitability feature of the 3D garment model for applying the according garment finish preset.

In some embodiments, the at least one tag is indicative for a necessary or suitable opening type, slit, boundary profile, opening circumference, dimension, or pocket spot to be identified in the at least one 2D pattern piece, the 3D garment model, or the at least one 3D panel model.

BRIEF DESCRIPTION OF THE DRAWINGS

By way of example only, preferred embodiments of the invention will be described more fully hereinafter with reference to the accompanying figures, wherein:

FIGS. 6 to 10 show an exemplary garment finish preset generation process;

DETAILED DESCRIPTION OF THE DRAWINGS

Figure 1:
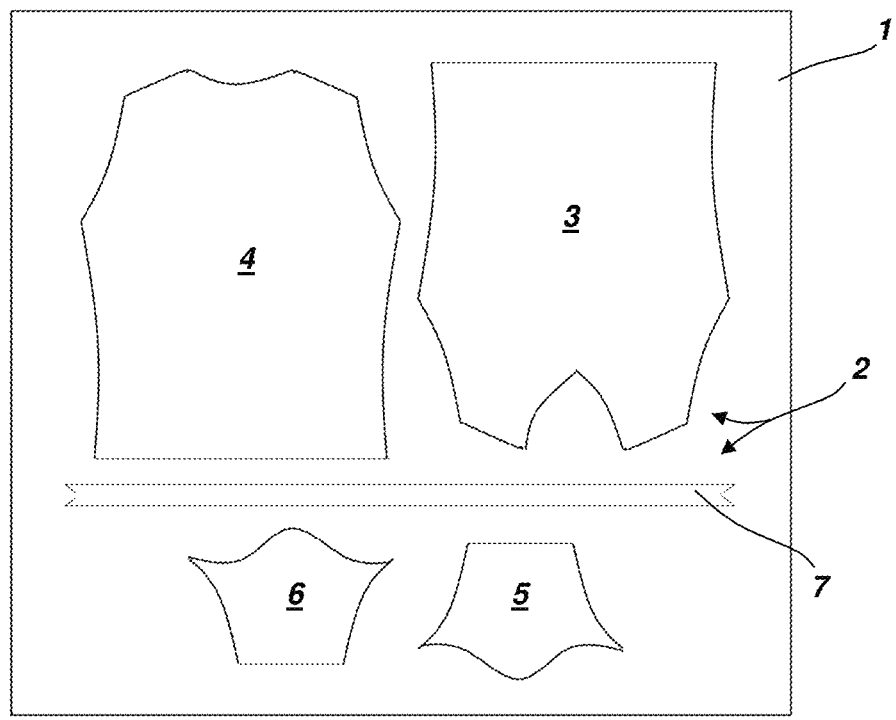
FIG. 1 shows an exemplary first document or at least a part of a third document.
Figure 2:
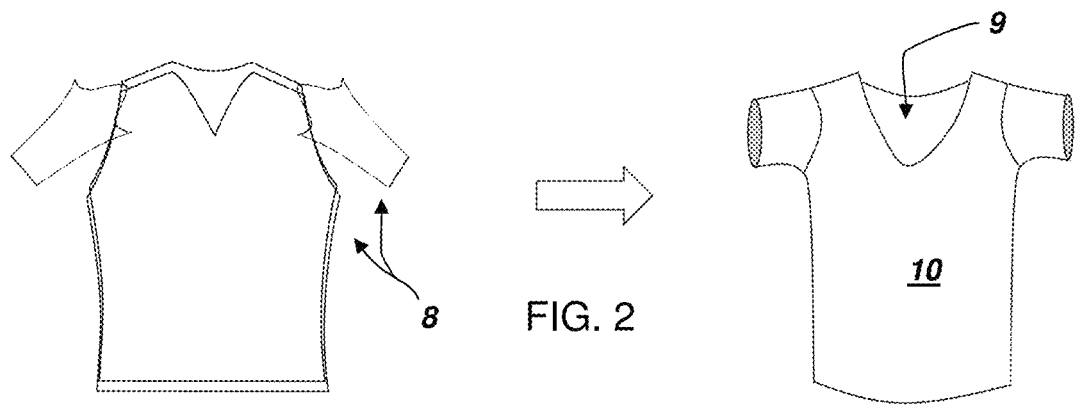
FIG. 2 shows an embodiment of preliminarily orienting and positioning 2D panel models on their dedicated poses within an avatar as a preparation for the virtual garment assembly.
Figure 3:
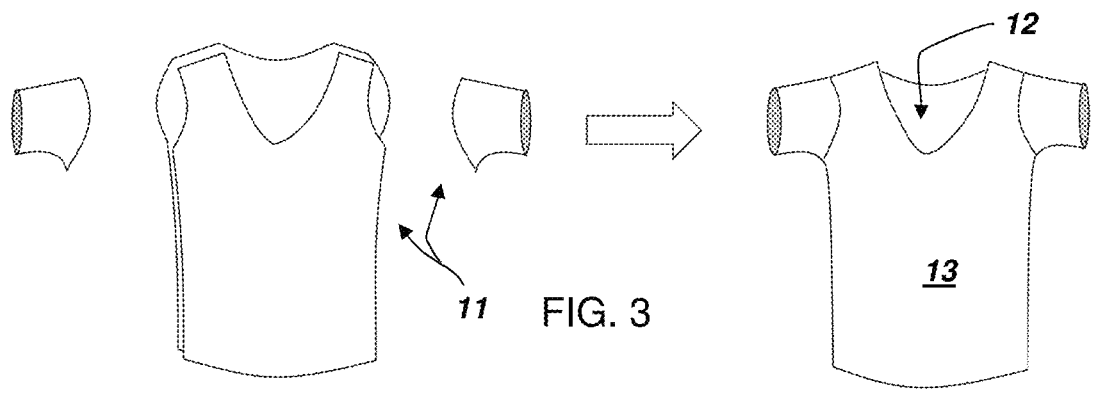
FIG. 3 shows an embodiment of pre-shaping 2D panel models into 3D panel models as a preparation for the virtual garment assembly.

FIGS. 1 to 3 show aspects that are used in the first computer implemented method as presented herein. The purpose of this method is to automatically generate a first 3D garment model such that it represents a first garment that is to be fabricated in reality from first garment panels.

With the first method it is therefore proposed to provide one or more first documents 1 which comprise a plurality of first 2D pattern pieces 2 that represent those the first garment panels. These documents could be a Computer Aided Design (CAD) file, a Portable Document Format (PDF) file, an image file in any format, or any other file containing computer-readable or human-readable 2D shapes of pattern pieces. In the shown example, the 2D pattern document 1 contains representations of the front and back panels of a T-shirt (3 and 4), the sleeve panels 5 and 6, and a neck binding (or neck tape) 7.

According to some embodiments of the invention, a garment type indicator for at least one of the first 2D pattern pieces 2 is determined with a pattern recognition algorithm. The garment type indicator represents a type of a garment that the respective first garment panel(s) belong(s) to. In this case, the pattern recognition algorithm detects that this document 1 belongs to a T-shirt because a typically shaped panel and/or a typical collection of typically shaped panels was detected.

The determined garment type indicator is one of a plurality of garment type indicators stored on the machine readable medium. For example, the garment type indicators can refer to the type of garment on a very basic level, like a T-shirt, pants, underwear, etc., but it can alternatively or additionally also refer to the type of garment on a more detailed level, like long-sleeved shirt or short-sleeved shirt, ladieswear or menswear, dressed or denim, suit pants or 5-pocket, etc.

Furthermore, a panel pose indicator is determined with the pattern recognition algorithm for each of the first 2D pattern pieces. The panel pose indicator represents an estimated position and an estimated orientation of the respective garment panel within the first garment. For example, the algorithm will identify a panel with the shape of the back piece 4 to be located in the back with the long straight line at the bottom. It will further identify the front piece 3 to be located in the front but turned around such that again the long straight line is at the bottom and the neck part in the top. The first 3D garment model is now generated based on the first 2D pattern pieces, the at least one garment type indicator, and the panel pose indicators.

FIGS. 2 and 3 show two examples of this positioning and orienting. These two ways of assembly can be complementing or be applied alternatively.

According to what is shown in FIG. 2, the first method may further comprise the generation of a first 2D panel model 8 for each of the first 2D pattern pieces 2, which are positioned and oriented in accordance with the panel pose indicators, wherein for generating the first 3D garment model 10, a reference object 9 is draped with the first 2D panel models 8. In the shown example, the reference object 9 is an invisible or transparent avatar having an average shape of a human body, in particular in accordance with the garment type indicator (woman/man/child, etc.).

According to what is shown in FIG. 3, the single components for the first 3D garment model 12 may be represented by first 2D panel models which are then pre-shaped before the final assembly to form first 3D panel models 11. As shown, each sleeve is wrapped around, e.g. to form a tube as shown, and sewed together, and the front and back panel are shaped following a typical chest and back form. In this way, assembling these first 3D panel models 11 to form a first 3D garment model 13 is straightforward because fewer computational effort is necessary to find the lines of connection (seams).

The first 3D garment model 13 is shown on a transparent avatar 12, but the reference object can also be a garment hanger or any other holder that presents the garment in such a way that a designer can easily work on the garment design in a CAD environment. The reference object can be two- or three-dimensional.

In summary, the first method may further comprise said positioning and orienting of the first 2D panel models 8 based on the panel pose indicators, in particular further based on based on a proportion of the first 2D pattern pieces 2 relative to each other. If also said proportion is taken into account, then the panels can be positioned and oriented already quite closely to each other (because the general size of the garment can be estimated) such that the rendering of the assembly is made more efficient.

While, before, or after said positioning and orienting the 2D panel models 8, the first method may include shaping each of the first 2D panel models 8 into first 3D panel models 11 so as they adapt to a shape of the reference object 13 (in the respective area) based on the at least one garment type indicator, and the panel pose indicators. Thus, according to a respective garment type indicator (in this case: a T-shirt), the first method may take into account information (which may be stored on the computer-readable medium) about the typical 3D shape of the respective panel.

Eventually, the first 3D garment model 13 is generated by virtually assembling the first 3D panel models 11 (which are the shaped first 2D panel models 8) along their respective edges. In particular, the first 2D or 3D panel models are virtually stitched together a default allowance away from the edges, wherein models of default seams can be provided at the virtual stitch lines.

In general, the first method may provide adding default finishes to the first 3D garment model based on the respective garment type indicator and/or the panel pose indicators. For example, in the awareness that the present garment is a T-shirt, the first 3D garment model 10/13 might be equipped with standard French seams, wherein in case of a jeans the method might equip the first 3D garment model with a standard lapped seam.

In an embodiment of the first computer implemented method, for determining a garment type indicator and the panel pose indicator, the pattern recognition algorithm is configured for analyzing at least one of (a) a shape of the 2D pattern piece, (b) a proportion of the 2D pattern piece relative to the other 2D pattern pieces, (c) textual information associated with the 2D pattern piece in the respective first document, (d) whether the 2D pattern piece is at least in part symmetrical or not, and (e) an amount of provided 2D pattern pieces.

A particular advantage of said first method is that the first 3D garment model is fully automatically generated without the need of manual intervention, based on merely the at least one first document with its depiction or description of the first 2D pattern pieces that represent the first garment panels from which the first garment is to be fabricated.

The first method, in particular the pattern recognition algorithm, may be trainable based on machine learning using training data from previous first 3D garment model generations. Specifically, such a machine learning algorithm can "learn" from user input that is aimed at correcting the automatic choices made by the computer.

Figure 4:
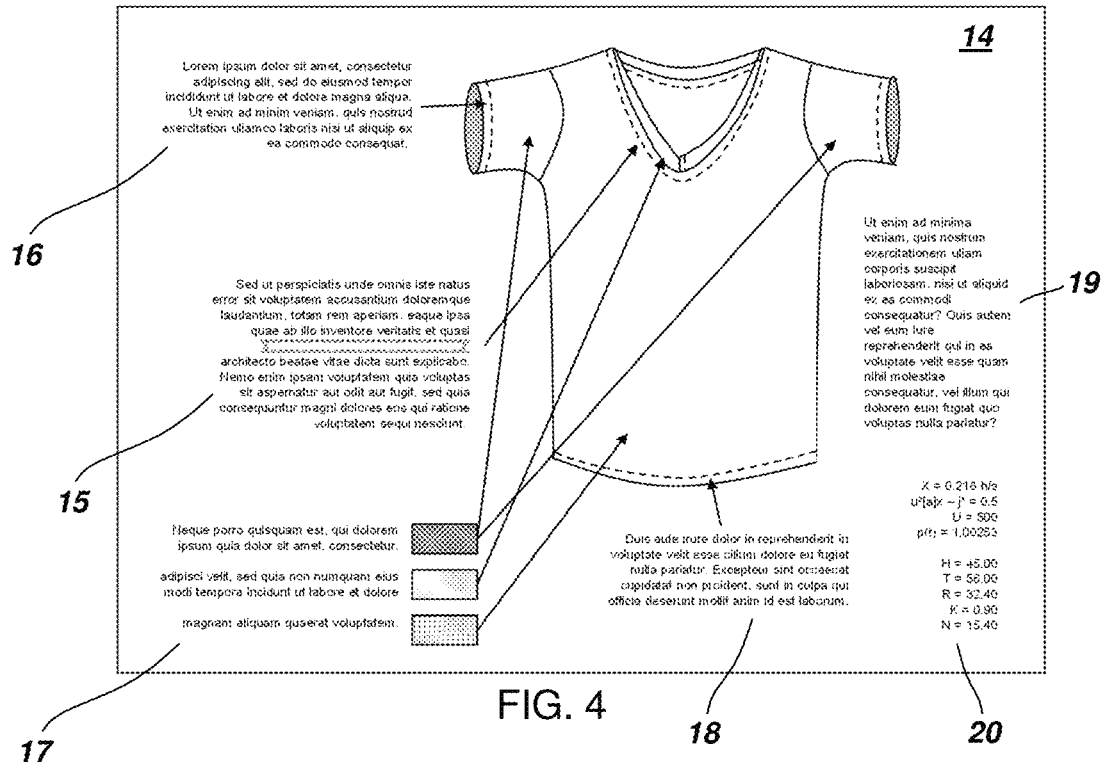
FIG. 4 shows an exemplary second document or at least a part of a third document.
Figure 5:
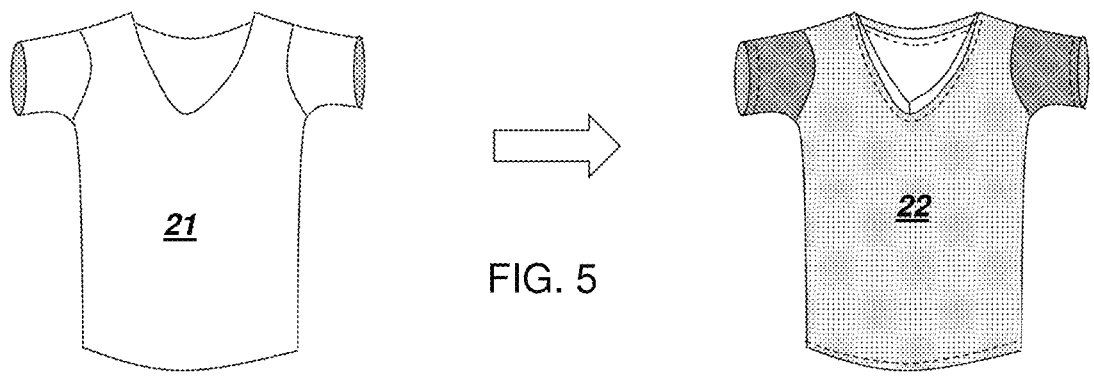
FIG. 5 shows an embodiment of finishing a 3D garment model that has no finishes yet based at least in part on the document as shown in FIG. 4.

FIGS. 4 and 5 show aspects that are used in the second computer implemented method as presented herein. The purpose of this method is to virtually finish a second 3D garment model which represents a second garment to be fabricated in reality and which does not yet have finishes or merely has default finishes.

With the second method it is therefore proposed to provide said second 3D garment model that has no or only default finishes and to further provide one or more second documents which comprise human-readable garment finishing instructions for finishing the second garment. One exemplary such document 14, often referred to as "Tech Pack" among experts, is shown in FIG. 4. These one or more second documents describe how a certain garment is to be finished. As such, the document may refer to several garment finish features, such as the type of fabric to be used, the color to be chosen for a specific component, the stitch type and a hem type to fabricate at an opening, the addition of certain elements, as well as further parameters and description that instruct a sewer to finish the garment. The instructions in such documents address humans and not machines. In the shown example of FIG. 4, the single garment finish features are pointed at with arrows and described with text, parameters, references to 2D patterns, and/or samples.

The second method provides an extraction algorithm that is configured to determine at least one such garment finish feature from the one or more second documents. Said garment finish feature corresponds to an additional garment component and/or a garment property, and is indicative for a position and an orientation of the respective additional garment component or garment property within the second garment. Therefore, the extraction algorithm specifically extracts all the information necessary to finish the garment as is provisioned in the second document(s). In particular, the extraction algorithm is configured to interpret the human-readable instructions and illustrations to establish the garment finish features.

The second 3D garment model is then virtually finished based on the determined at least one garment finish feature. Specifically, the second method may retrieve stored elements (e.g. 3D models of zippers or 2D models of seams) and/or model appearances (texture, color, etc.) in order to modify the second 3D garment model 21 (see FIG. 5) to form a finished second 3D garment model 22. In particular, the second method provides interpretations of garment finish features based on training data as to how and where the second 3D garment model 21 is to be modified in order to arrive at the finished second 3D garment model 22. Thus, when the garment finish feature corresponds to a fabric type 17 of at least part of the second 3D garment model, the at least part of the second 3D garment model is modified by attributing at least one of a texture and a color to at least part of the second 3D garment model based on the garment finish feature.

If the garment finish feature corresponds to seams of the second garment (see for example reference 18), the at least part of the second 3D garment model is modified by attributing at least one of a thread color, a thread type, and a stitch pattern to seams of the second garment.

Virtually finishing the second 3D garment model 21 may as mentioned also comprise adding at least one garment finish model to the second 3D garment model. For example, as shown in FIG. 4, the V-neckline is hemmed with an added neck tape (see reference 7 in FIG. 1) referred to in the text 15 pointing at the neckline. In other embodiments, the neckline may be a boundary for further shaping the upper edge of the garment with a collar, cowl, darts, or pleats.

If the garment finish feature corresponds to seams of the second garment, the at least one garment finish model may represent stitches to be placed at dedicated locations within the second garment, see reference 15, 16, and 18 in FIG. 4. If the garment finish feature corresponds to bindings of the second garment (see reference 18), the at least one garment finish model may represent a hem to be placed at the lower opening of the second garment. Therefore, in the given example of FIG. 5, the bottom edge of the second 3D garment model 21 is turned down (or just shortened for the sake of visualization) and virtually stitched.

In an embodiment of the second computer implemented method, the garment finish feature may also correspond to a closure of the garment (not the case in the shown example), wherein the at least one garment finish model represents at least one of a button, a buttonhook, a snap fastener, a zipper, a touch fastener, a magnetic fastener, a hook, a loop for a hook or a button, a cord fastener, and laces.

Specifically, for determining the at least one garment finish feature, the extraction algorithm may be configured for analyzing the one or more second document 14 with respect to at least one of: textual information 15-19, image data, arrows, size data 20, color swatches 17, color indicators, stitch types, and stitch designations. The algorithm may be trained to search the second document(s) 14 for keywords, known patterns in describing a garment finish feature, arrows (especially the alignment of arrows), numeric values (especially typical number ranges), and so on.

Specifically, the second 3D garment model 21 may be an assembly of a plurality of second 3D pattern pieces representing second garment panels that the second garment is to be fabricated from, i.e. just as it is established as first 3D garment model by the first method described above. This first 3D garment model lacks finishes or is equipped with default finishes because it is based on the first 2D pattern pieces comprised by the first document which is usually silent about how the panels are to be assembled.

In a special embodiment, the third method as presented herein is a combination of the first and second method. However, more generally speaking, the purpose of the third method is to automatically generate a plurality of third 3D garment models in a batch process, each third 3D garment model representing a third garment to be fabricated from third garment panels. According to the third method, for each third 3D garment model to be generated, one or more third documents are provided. Said third document(s) comprise(s) a plurality of third 2D pattern pieces representing the third garment panels and human-readable garment finishing instructions for finishing the third garment. Hence, just as for the assembly process in reality, the garment patterns and corresponding instructions ("Tech Pack") are provided.

The patterns of the third 2D pattern pieces are then automatically recognized, based on which a fourth 3D garment model is generated. From the human-readable garment finishing instructions, at least one garment finish feature is extracted, based on which third 3D garment model is generated by virtually finishing each of the fourth 3D garment models. Even if the nomenclature suggests otherwise, the fourth 3D garment model is a "work-in-progress" and is predecessor to the third 3D garment model.

After a plurality of third 3D garment models have been batch-processed, a report is generated which is indicative for at least one of: (i) could all third documents be translated into fourth 3D garment models? (ii) specifically which of the fourth 3D garment models could be generated? (iii) with what level of confidence (likelihood of correctness) was each of the fourth 3D garment models generated? (iv) specifically which of the fourth 3D garment models could not be generated? (v) which of the fourth 3D garment models could be generated only in part and to what extent (e.g. what part is missing)? (vi) could a third 3D garment model be generated from each of the fourth 3D garment models? (vii) which of the third 3D garment models could be generated? (viii) with what level of confidence (likelihood of correctness) was each of the third 3D garment models generated? (ix) which of the third 3D garment models could not be generated? and (x) which of the third 3D garment model could be generated only in part and to what extent (what part or feature is missing)?

The report may be used by a user to quickly find out about the unsuccessful or partly successful conversions in order to manually correct the respective models or give feedback to the computer (e.g. by confirming or rejecting the respective part of the report). The report and/or the manual corrections/user feedback may be used to further improve or train the pattern recognition, the extraction, and/or the virtual panel assembly.

Specifically, recognizing the patterns of the third 2D pattern pieces may be based on determining, with a pattern recognition algorithm, a garment type indicator for at least one of the third 2D pattern pieces and a panel pose indicator for each of the third 2D pattern pieces. Generating the fourth 3D garment model is further based on the garment type indicator and the panel pose indicator.

Said garment type indicator represents, or in other words: is indicative for, a type of a garment that the respective third garment panel belongs to. The garment type indicator may be selected from a plurality of garment type indicators stored on the machine readable medium. Said panel pose indicator representing, or in other words: is indicative for, an estimated or preliminary position and an estimated or preliminary orientation of the respective garment panel within the third garment.

Furthermore, the extraction of the at least one garment finish feature may be based on determining, with an extraction algorithm, the at least one garment finish feature from the one or more third documents, in particular from the human-readable garment finishing instructions for finishing the third garment. The garment finish feature corresponds to an additional garment component or a garment property and represents, or in other words: is indicative for, a position and an orientation of (a) the respective additional garment component or (b) the respective garment property within the third garment.

For determining the at least one garment finish feature, the extraction algorithm may be configured for analyzing the one or more third documents, in particular the human-readable garment finishing instructions for finishing the third garment, with respect to at least one of: textual information, image data, arrows, size data, color swatches, color indicators, stitch types, and stitch designations.

The one or more third documents that correspond to a single garment (for which the third 3D garment model is to be generated) may in particular be so-called "Tech Packs" with corresponding 2D patterns and assembly instructions. This could all be combined in one file or document, however, it may also be provided as two or more correlated files or documents.

It is noted that the text in FIG. 4 is dummy text (lorem ipsum) the only purpose of which is to indicate that in such a document there may be several text passages for assembly guidance and similar comments addressed to the human user, i.e. non machine-readable. FIG. 4 shows an example for at least a part of a second document and for at least a part of a third document.

FIGS. 6 to 10 show an exemplary garment finish preset generation process. By clicking a button 23 with a mouse cursor, the process of generating a new finish preset is initiated. The design steps or assembly steps following the initiation are then tracked and sampled. FIG. 7 then shows a first exemplary design step, wherein a garment panel edge 24 is folded by 180° which is initiated by clicking a design tool button 25 with the mouse cursor (1). Then (2), the amount of distance by which the edge 24 is folded can be determined by the mouse cursor drag-and-dropping the edge 24 at the desired location, which results in the hem edge 26. In a further step, as shown in FIG. 8, the stitch type can be chosen with the drop-down button 27. A variety of different stitch types is shown with dropped-down buttons, among which the user selects (1) the zig-zag pattern as per button 28. The user then (2) defines the location on the garment model where the zig-zag stitch should run, i.e. with what distance to the hem edge 26. With an exemplary button 29 (see FIG. 9), the user can end the sampling and finalize the finish preset. A prompt window 30 then shows up to save the preset under a desired name. The data or file containing the garment finish preset describes everything that is needed to assemble the finish, i.e. it comprises information about what finish parts are used (in the shown case: the thread to stitch the seam) and about what assembly steps are involved in manufacturing the finish from the finish parts (in the shown case: folding, length of overlap). This may comprise that each part involved is stored with different states for each assembly step, i.e. for example, in a first step a garment panel is unfolded, in a next step the same part is folded at a defined place, etc. They are the same piece but have different positions, orientations, and shapes depending on the commands the user has created to act upon them.

Figure 11:
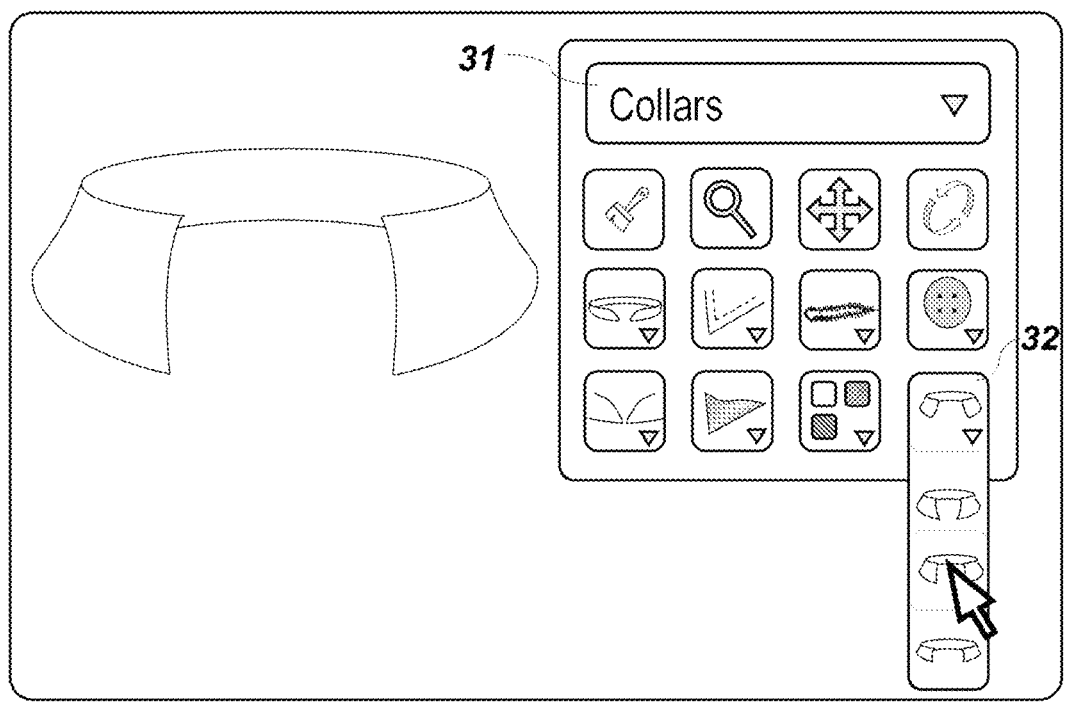
FIGS. 11 to 13 show another exemplary garment finish preset generation process.
Figure 12:
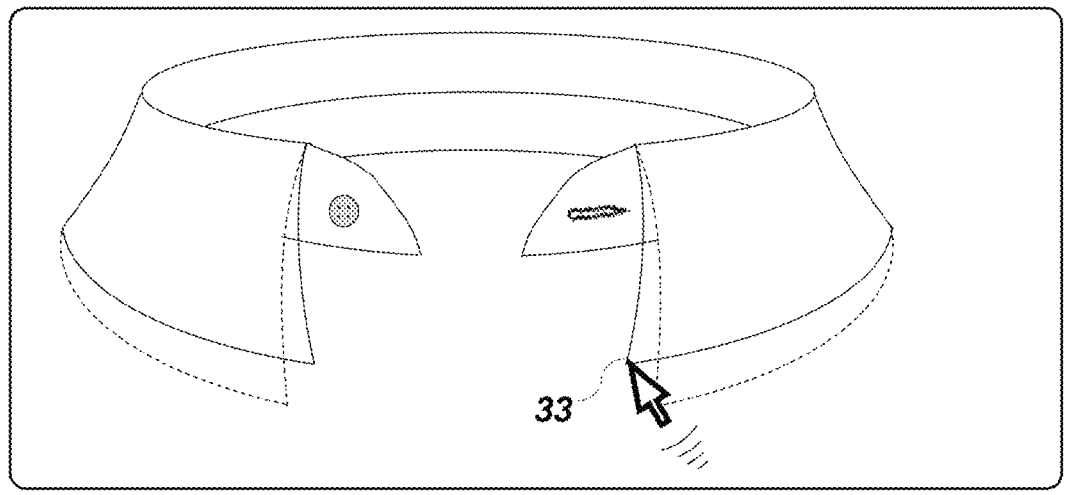
Figure 13:
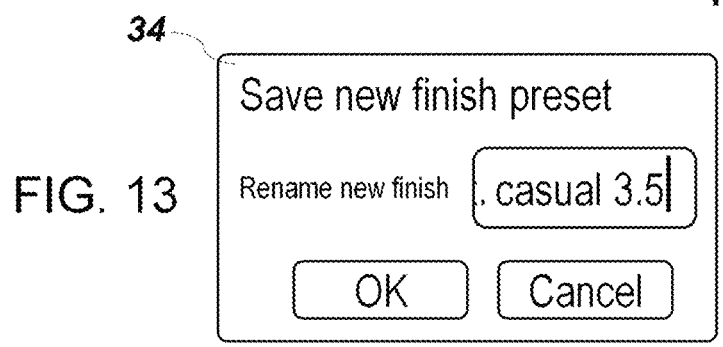

FIGS. 11-13 show another exemplary garment finish preset generation process, wherein a user assembles a customized collar made of several different finish parts. With the drop-down menu bar 31, category "Collars" is selected to display underneath it all available design tools related to collars. Different collar shapes can be selected with the button 32. Further options may be but are not limited to the neck band size or shape or style, stitch type, button hole type, button style, cloth type or color.

FIG. 12 shows how the finish parts can be parametrically altered. For example, as shown, the user can click on the collar edge 33 and drag it to a different position to reshape the collar. The other side of the collar is altered in the same manner either simultaneously or afterwards in order to maintain symmetry. When the collar is complete, i.e. all belonging parts are selected and assembled, and all components have the desired style or shape, the user can trigger a "save as . . . " window 34 to store the preset under a desired name. What this saved file will contain is a computer-interpretable data collection of what finish parts are comprised by the garment finish preset and what assembly steps are involved in manufacturing the finish from the finish parts. The preset can be retrieved in a virtual 3D environment and can be applied, either manually or automatically, to a garment model which is also loaded into the virtual 3D environment.

Figure 14:
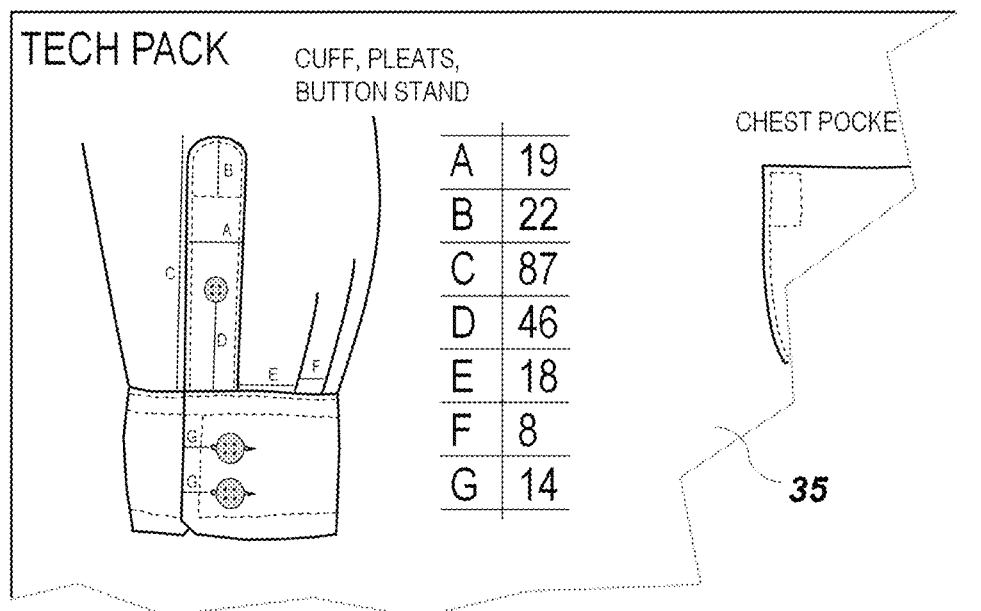
FIG. 14 shows an exemplary automatic garment finish preset generation process.
Figure 14:
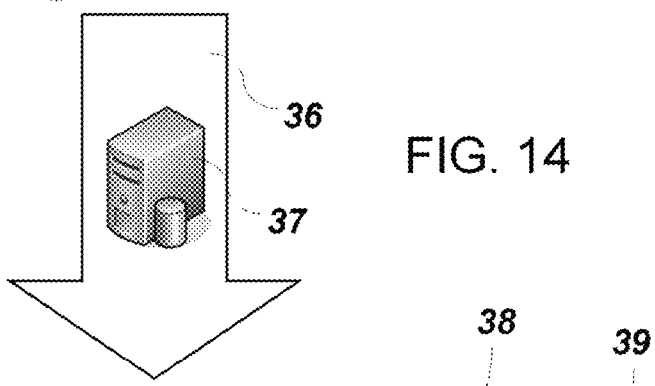
Figure 14:
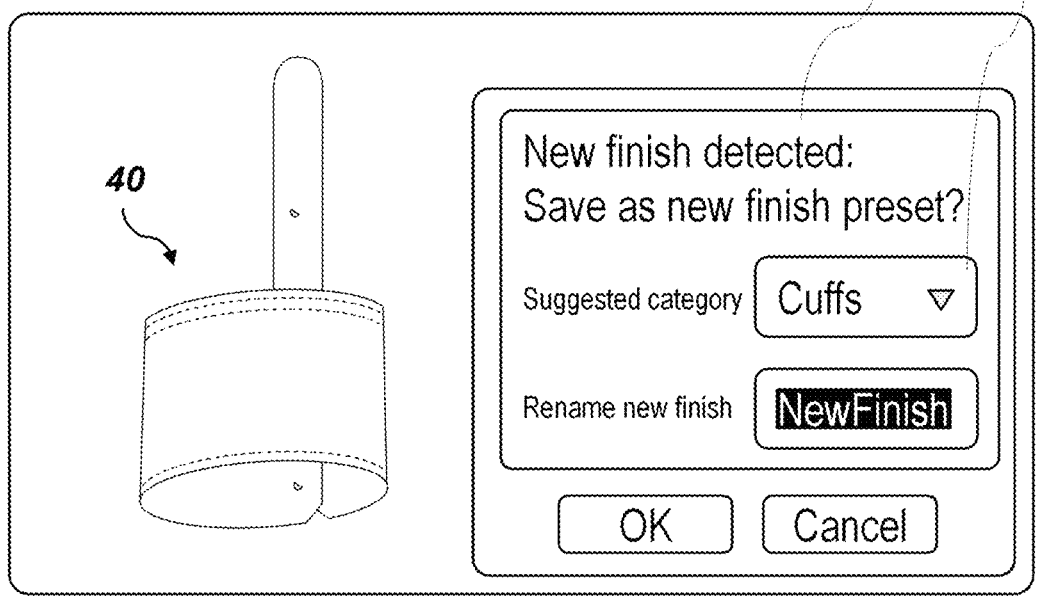

FIG. 14 shows an exemplary automatic garment finish preset generation process based on documents as they are explained above in context of FIG. 4. Such documents, which are often referred to as "Tech Packs", usually comprise information on how a certain garment is to be finished and that information is exclusively meant for humans to read and understand (not for computers). Specifically, these documents usually comprise drawings, images, arrows, size data, color swatches, color indicators, stitch types, stitch designations (location), textual and/or numerical information that serve as instructions about how to manufacture the finish. As such, "Tech Packs" are often highly individual also with regards to the ways they express the contained information. An extraction algorithm automatically determines garment finish features based on the documents. More specifically, the extraction algorithm is trained, based on feedback and/or experience, to interpret drawings or images with respect to 2D/3D depiction. For example, the extraction algorithm can distinguish between 2D depictions and 3D depictions and extract the correct dimensions and/or proportions based on this recognition.

Referring to FIG. 14, the document 35 contains a drawing of a cuff next to a lookup table that refers to the respective dimensions of the cuff regions. The extraction algorithm 36 executed on a computer 37 is trained to analyze the drawing and the values in the table and translates the information into a garment finish preset, that can be saved, for example, after confirmation via the pop-up window 38. Optionally, the newly created preset can be linked to category and the window 38 may comprise a suggestion which can be overruled by the user in the box 39.

The newly created garment finish preset 40 can also be automatically displayed to support the user in deciding what finish it is and if every information available in the document was (correctly) interpreted by the extraction algorithm. To check every aspect of it (e.g. the buttons on the backside), the model 40 of the finish may be configured to be three-dimensionally rotatable in the virtual 3D environment. It is possible that, such as in the shown case, one single document contains more than one finish instruction (see the chest pocket next to the cuff). The extraction algorithm is particularly configured to distinguish between a plurality of different finishes and associate the available data correctly.

The extraction algorithm specifically extracts finish features from the drawing based on which the single finish parts of the finish are identified and used to virtually assemble the whole finish. The extraction algorithm may further be configured to identify, or interpret the garment finish features to determine a position and an orientation of the finish that it usually occupies within a garment.

In particular, when a preset is recorded for example like it was explained with FIGS. 6-10 or with FIGS. 11-13 or with FIG. 14, the respectively proposed computer implemented method may automatically associate counter-parameters or tags to the finish. For example, the hem preset as seen in FIG. 8 would be equipped with tags representing the presence of a boundary or sleeve or opening of a garment, as it would be applicable to such places. The collar as created in FIG. 12 would automatically be attributed with an indicator that this preset is applicable to an neck opening, and also generally, that it is suitable for shirts (garment type indicator). These kind of tags make it possible to identify a suitability and possibly also a degree of suitability (likelihood) when the designer or the software searches for applicable finishes. Even more specifically, when turning to the example of the cuff in FIG. 14, the edges of the cuff could also be assigned with counter-parameters or links or tags or attributes indicating where exactly it needs to be assembled with the sleeve of a shirt. However, these counter-parameters may also be added or defined manually by the user of the software. The above mentioned counter-parameters are labeled "counter" because they correspond to parameters comprised by the main garment. So, in a way, these parameters can be understood as tie points (panel boundary parameters) but potentially also as features that help to identify them.

Figure 15:
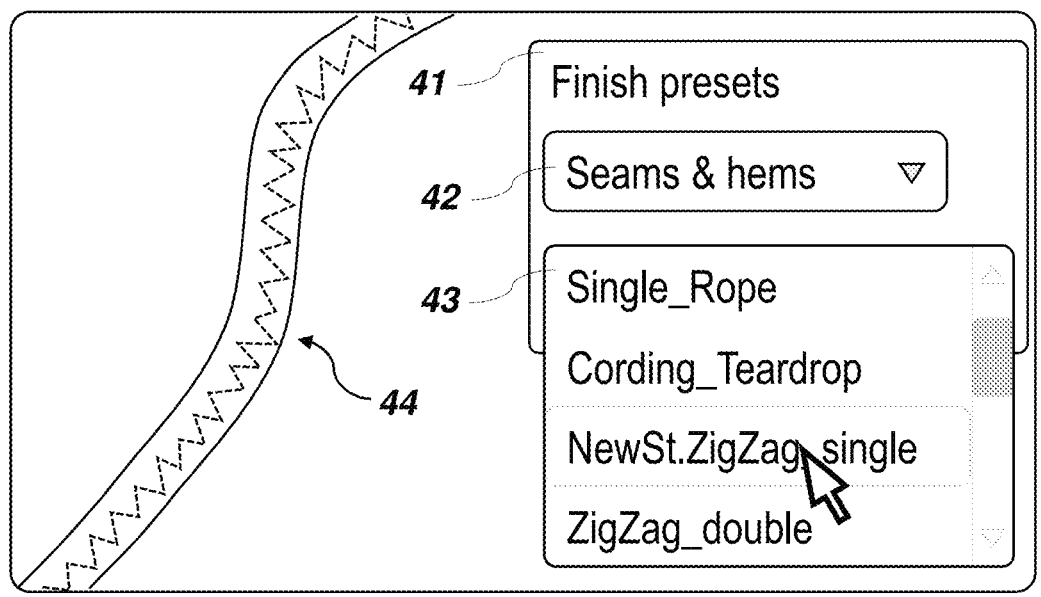
FIGS. 15 to 16 show an exemplary garment finish preset retrieval and application process.
Figure 16:
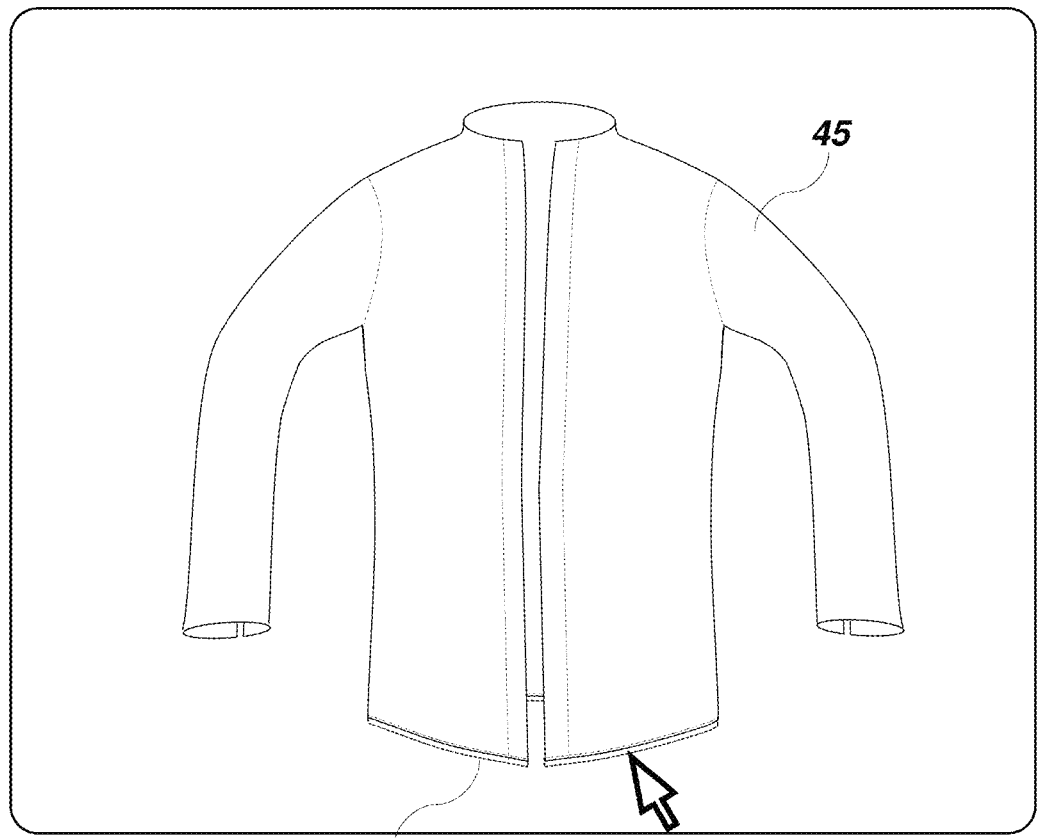

FIGS. 15-16 show an exemplary garment finish preset retrieval and application process. Let us suppose that the finish preset generated with the process described with FIGS. 6-10 was saved under the name of "NewSt.ZigZag_single" and that the user can now retrieve this preset in the window 41 by first selecting a category of the desired element in the field 42 and then pick it among all the presets saved under this category. Next to the finish preset selection window, the GUI can provide a preview 44 of the finish. The next step is shown in FIG. 16: A garment 45 loaded into the virtual 3D environment can now be "equipped" with the selected finish, wherein the user needs to define the location within the garment model 45 where the finish shall be applied. He does this by selecting the bottom opening 46 of the shirt 45.

Figure 17:
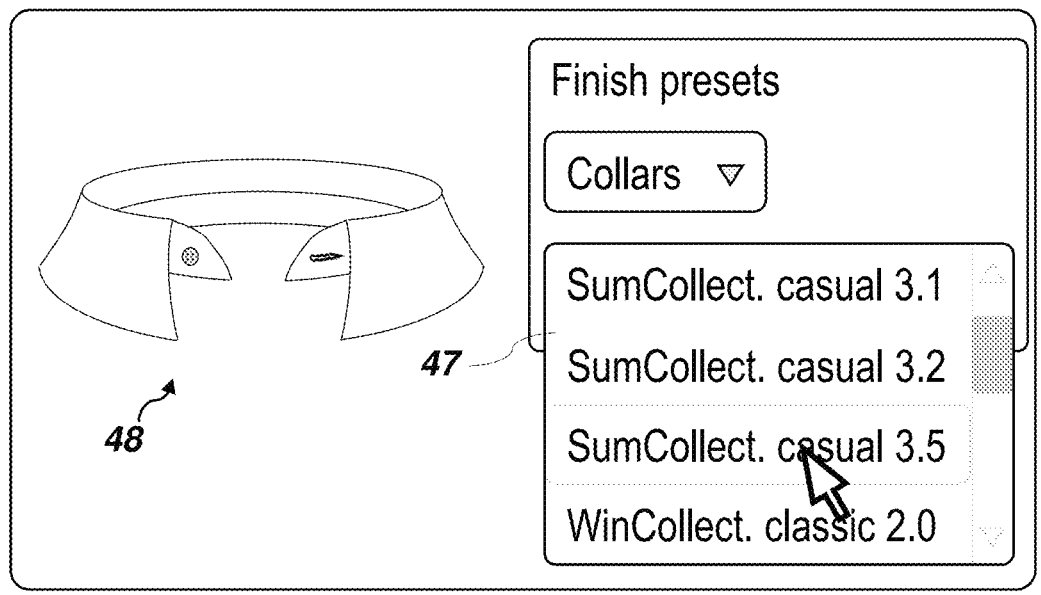
FIGS. 17 to 18 show another exemplary garment finish preset retrieval and application process.
Figure 18:
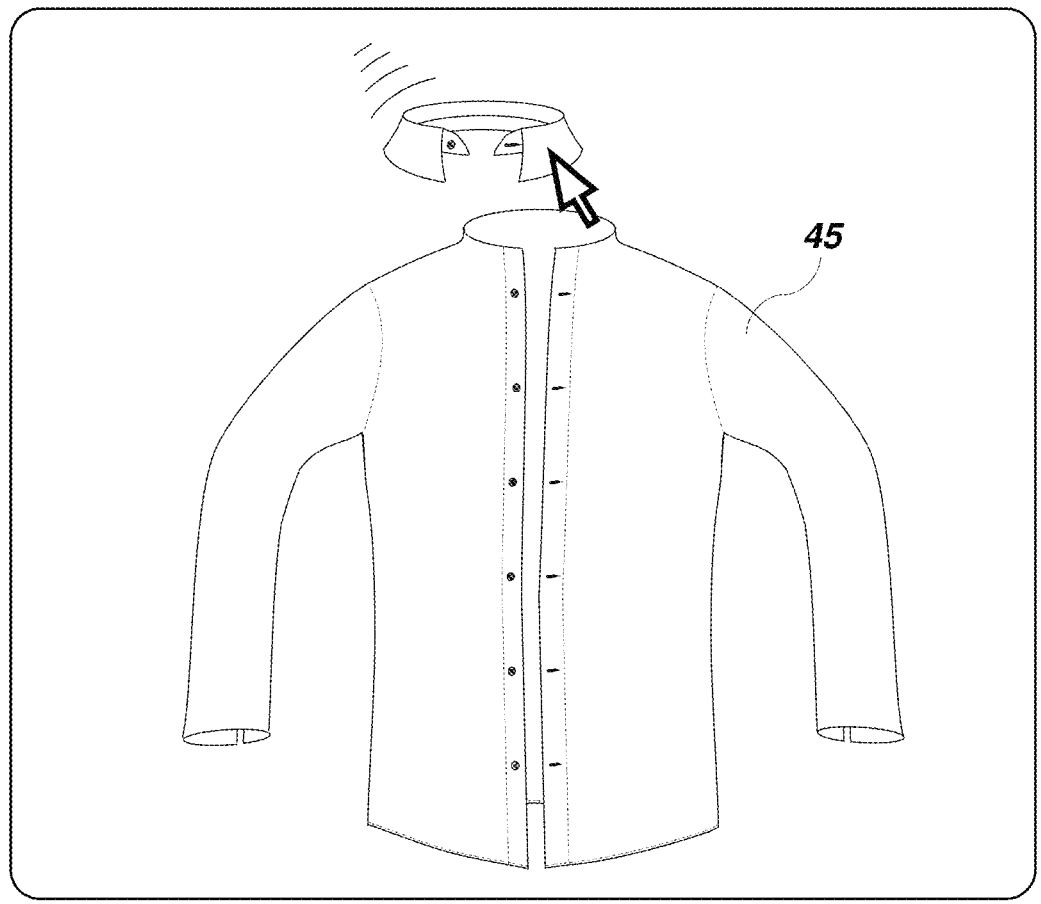

FIGS. 17-18 show another exemplary garment finish preset retrieval and application process. First, the category "Collars" is selected which causes the finish preset drop-down menu 47 to load all available collar presets. Let us once again suppose that the finish preset generated with the process described with FIGS. 11-13 was saved under the name of "SumCollect. Casual 3.5" and that the user can retrieve this preset in the menu 47. A preview 48 may be loaded and displayed when hovering over the single presets. When clicked on, the selected collar is loaded into the virtual 3D environment where also the garment 45 has been designed before. The collar could be automatically inserted at the correct place, or, as in the shown case, it may be dragged by the user to the desired location, where it is, automatically or upon demand, assembled with the shirt 45.

Figure 19:
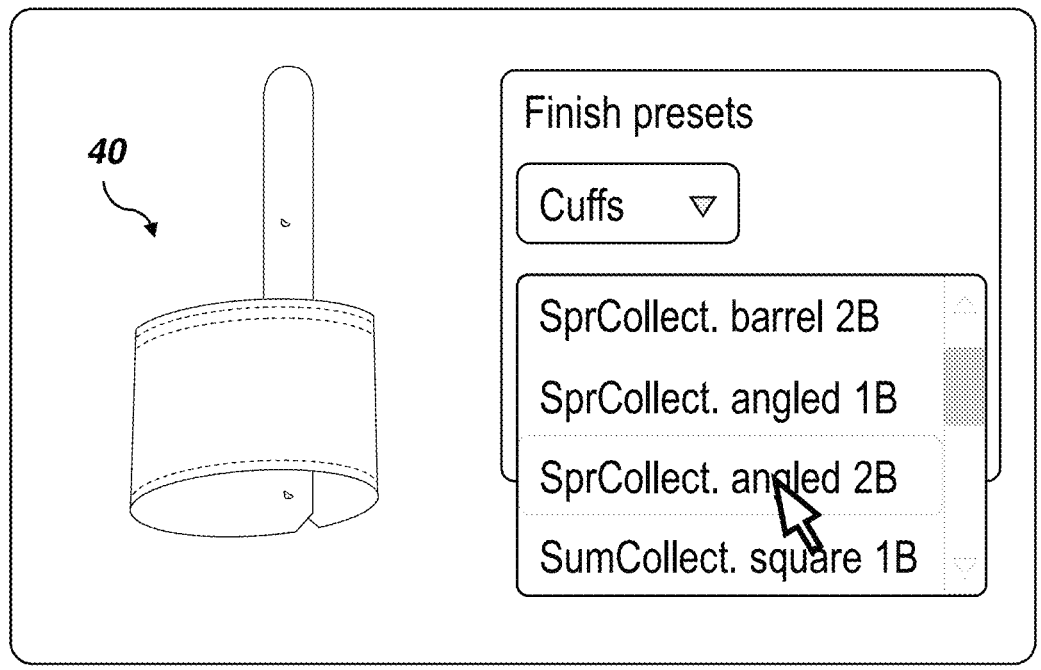
FIGS. 19 to 20 show yet another exemplary garment finish preset retrieval and application process.
Figure 20:
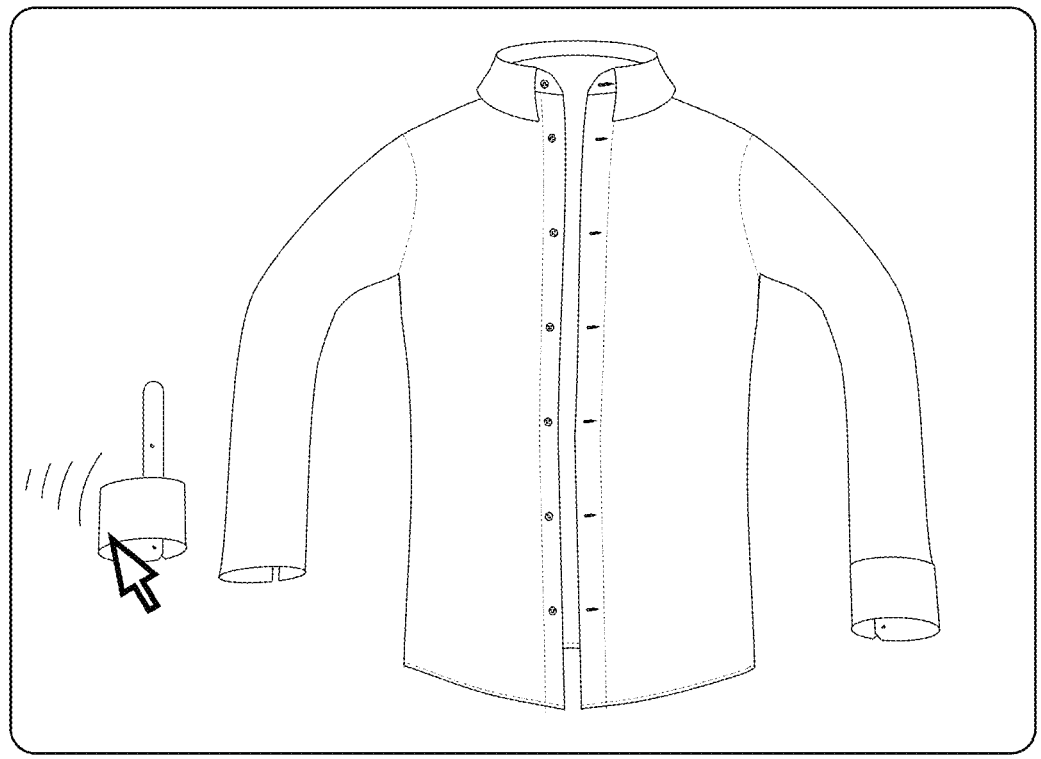

Finally, FIGS. 19-20 show yet another exemplary garment finish preset retrieval and application process. This time, the cuff that was automatically generated from the tech pack (see FIG. 14 and corresponding description) is loaded into the virtual 3D environment, which again serves as GUI in that the cuff can be displaced by the cursor to be linked to the sleeve of the shirt.

Generally, according to at least some aspects of the present invention, a garment finish presets (generated in whatever way) can be suggested to a designer, i.e. a user of the virtual 3D environment of a garment design software, based on its suitability with a 3D garment model already at hand, or a 2D pattern set representing the panels that the respective garment is to be fabricated from.

The garment finish preset may be understood as a set of macros that can be applied across garments. In order to find out if one of a plurality of garment finish presets stored in a library is suitable for a present garment, the features of said garment shall be identified. That may include, but is not limited to, pieces types and segments types, e.g. based on detected outside boundaries.

In particular, the garment (which is either at hand already in 3D shape or to be assembled based on 2D pattern pieces) comprises parameters or "tags", that for example represent the existence of at least one of openings, other links, dimensions, locations of a specific feature, names, typical features that may be added at a specific location, garment category, etc.

Specifically, an indicator for the type of garment and an indicator for the type of the panels that the garment is comprised of are identified and based on the identified indicators, a list of suggested, likely suitable presets (candidates) is generated. For example, identifying a T-shirt and that the T-shirt has a short-arm sleeve, the software would present as a candidate garment finish preset a seam pattern for the shoulder area and for the hem of the sleeve. The identification algorithm would further identify the neck opening and thus trigger the suggestion of a neck binding, and so on.

It is highly likely that more than just one "candidate" for a suitable garment finish preset is found, which is why the computer implemented method may further provide a list of priorities, or a "ranking" so to speak, that provides a plurality of garment finish presets sorted after the likelihood of suitability, which may be derived by analyzing how many requirements are fulfilled in view of the garment at hand.

But the garment finish features contained by the suggestion list do not necessarily compete. For example, if the garment is identified as a shirt, it is determined that e.g. pockets, collars, cuff, neck binding, and slits are indeed suitable to be added to the garment. These finishes (pocket, collar, cuff, neck binding, slits) are detected based on said tags or parameters, i.e. each of the corresponding garment finish presets has a group of counter-parameters, and each group of these counter-parameters has an overlap with the group of parameters of the shirt model (or shirt pattern pieces). For each identified suitable garment finish preset (pocket, collar, cuff, neck binding, slits), one or more differently styled preset may be suggested. For that, even an analysis of style, shape, color, or cloth type me be undertaken to generate a list of priorities.

In any case, upon selecting a garment finish preset to be added or applied to a garment loaded into the virtual 3D environment, in accordance with embodiments, the parts contained by the preset are automatically resized (in particular also reshaped) to fit the places where they are added to the garment (e.g. the opening in case of a collar or cuff).

In case only a set of 2D pattern pieces is loaded (either only in the background, or indeed loaded into the virtual 3D environment), a garment finish preset may also refer to a more basic set of assembly instructions, e.g. a specific way how to sew the pieces of a T-shirt together. All information necessary to do so (type of sewing thread, color, type of seam, type of hems, etc.) are stored in the preset and automatically applied in the correct order to the T-shirt panels.

In particular embodiments, the garment finish features stored in the library can be understood as "user defined finishes" comprised of a reusable list of commands (like a macro) that allow the user to assemble a portion of the garment using a series of commands. The commands are things like: "fold a piece", "place a piece relative to another piece in this way", "sew two segments together", "create a piece of a certain size", "add a slit to a piece", "invert a piece", etc. These commands or instructions can be executed to assemble or adjust a finish on the garment model. The garment finish presets mirror the steps to some degree of the actual assembly of the garment component and can be applied to all garments that are identified to be suitable. For this identification, each piece and each segment (a continuous portion of the boundary), each drill point, notch point, and internal line may be given unique identifiers (parameters) that work across all similar garments. The orientation that a piece is to adapt should be consistent (for example a pocket bag), i.e. if e.g. a piece is folded according to a preset, the fold instruction has to assume the piece being oriented consistently so the fold will work the same way on all similar garments or pieces.

In other words, with some embodiments of the invention, a new "language" is proposed that make predefined finishes "comprehensible" and applicable to a plurality of other same or similar type garments.

Method for Fabricating a User-Generated Garment

Figure 21:
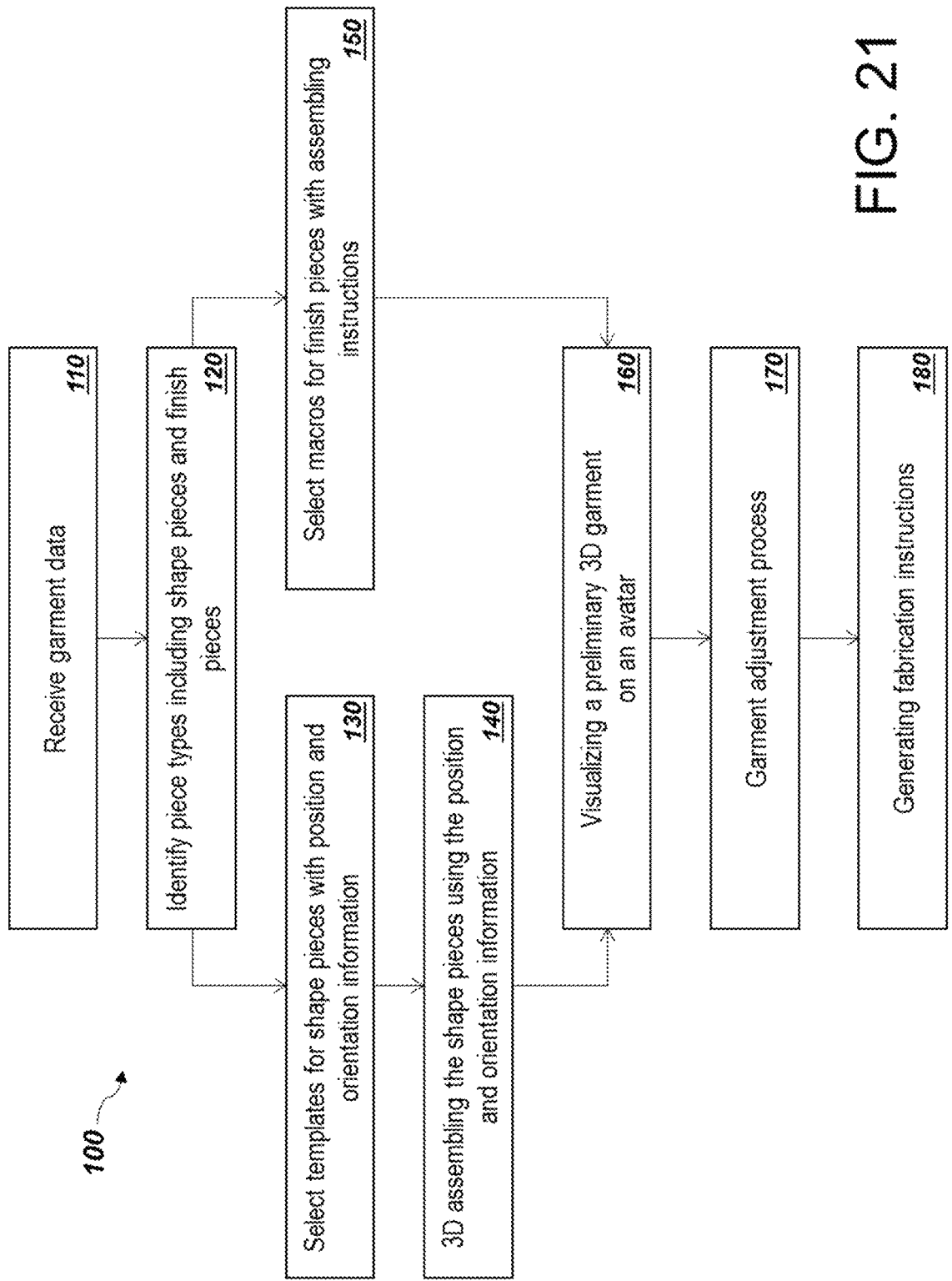
FIG. 21 illustrates an exemplary method for fabricating a user-generated garment.

FIG. 21 is a flowchart illustrating an exemplary embodiment of a method 100 according to the invention for fabricating a user-generated garment. The method allows a designer ("user") to adapt a predefined or default garment in a graphical user interface (GUI), wherein fabrication instructions are automatically generated. Some or all steps of the method may be performed automatically in a computer system. A computer program product, i.e. a software, may run on the computer system to execute the method. Some embodiments of the method may comprise some or all processes, steps or features of one or more of the methods described above with respect to FIGS. 1 to 20.

The method starts with receiving 110 garment data. Said garment data relates to a predefined or default garment and at least comprises garment piece data related to a plurality of 2D garment pieces, from which said predefined or default garment is (or can be) assembled. FIG. 1 shows an example of such garment piece data. Receiving the garment data for instance may comprise loading a file into a memory of the computer system, e.g. upon receiving a respective user input. Said file can be a 2D CAD file, a DXF file or a file in a similar format.

Optionally, the received garment data may further comprise a garment type identifier that identifies—or allows identifying—a garment type of the predefined or default garment (e.g. skirt, dress, shirt, top). For instance, the garment type also defines areas of the human body that the garment is intended to cover. Alternatively or additionally, the garment type may define relative positions of garment pieces. Also, the garment type may define a plurality of openings of the garments, e.g. openings resulting from the relative positions. Each of these defined openings is necessary to accommodate a certain part (or certain parts) of the human body, such as arms, legs and neck. For example, a top has four openings: two for the arms, one for the waist and one for the neck. Optionally, a list comprising a plurality of garment type identifiers for a plurality of different garment types is provided to the user, and the garment type identifier is selected from the list by the user.

Optionally, the received garment data may further comprise at least one document comprising a human-readable information describing the predefined or default garment, and the human-readable information is converted into computer-readable instructions by a trained expert system of the computer system. For instance, the human-readable information may be provided in the form of a "Tech Pack" as illustrated in FIG. 4. Another example for human-readable instructions is provided in FIG. 22. The human-readable information may relate to at least one of construction details, a bill of materials, a colorway, and a size chart for the garment. Said human-readable information may be or may comprise textual information. In this case, the trained expert system analyzes the at least one document with respect to the textual information and converts the textual information into the computer-readable instructions, which may comprise a fully digital description of the predefined or default garment with respect to the 2D pattern pieces, the preliminary 3D garment and further properties of the predefined or default garment. Such further properties may include stitches, seams, finishes, trims, or assembly instructions.

Based on the received garment data, a trained recognition algorithm of the computer system then identifies 120 a piece type of each of the 2D garment pieces. The trained recognition algorithm is an expert system that has been trained to recognize the many varieties of pattern piece shapes and to identify them.

This identification also includes a separation of the garment pieces into the two larger categories "shape piece" and "finish piece". Shape pieces are flat fabric pieces that together provide an overall shape of the garment when assembled, whereas finish pieces are parts of finish features of the garment, including features such as closures and fasteners, e.g. cuffs, plackets, flies, pockets, waistbands, collars etc.

Further information may be provided to the algorithm to enhance the identification of the piece types, e.g. to accelerate the identification or make it more robust. For instance, if a garment type identifier with information about the garment type is received as part of the garment data, identifying the piece type may also be based on this identifier. Also, if the received garment data comprises one or more documents comprising human-readable information that is converted into computer-readable instructions, identifying the piece type may also be based on these computer-readable instructions.

Having identified the shape pieces during the identification 120 of the piece types, templates are selected 130 that comprise information about position and orientation of the shape pieces relative to a human body. This selection comprises selecting 130 one template for each of the identified shape pieces from a set of pre-defined templates, wherein the selection is based on the identified piece type. Additionally, each template assigns consistent identifiers to segments of the respective shape piece, e.g. to seams and sewing edges. Also, templates may be selected for the identified finish pieces, wherein each template assigns consistent identifiers to the respective finish piece and/or to segments thereof. Optionally, the template also comprises information about position and orientation of the shape pieces relative to a human body.

Using the position and orientation information for each shape piece provided by the templates, the shape pieces are three-dimensionally (3D) assembled 140 in an iterative proximity approach. "Iterative proximity" in this context means that different combinations of potential matches are tried until the shape pieces and the resulting openings together form a garment. If a garment type identifier with information about the garment type is received as part of the garment data, 3D assembling the shape pieces may be based also on the garment type, e.g. to accelerate the assembling or make it more robust. Also, if the received garment data comprises one or more documents comprising human-readable information that is converted into computer-readable instructions, 3D assembling the shape pieces may also be based on these computer-readable instructions.

Having identified the finish pieces during the identification 120 of the piece types, finish macros are selected 150 that comprise assembling instructions for the finishes. This selection comprises selecting 150 one macro for each of the finish pieces from a library of pre-defined finish macros. Each finish macro comprises assembling instructions for assembling (e.g. sewing) the respective finish piece to one or more 3D assembled shape pieces. Optionally, i.e. depending on the type of the finish, the assembling instructions may also comprise instructions for assembling the finish piece with other finish pieces in order to form the finish feature together. Selecting 150 the finish macros may be based on the garment piece data, e.g. on the garment type identifier or on the human-readable instructions that have been converted into computer-readable instructions. Also, a user may select default finishes for a certain garment type, and the selection is based on an identified garment type and the default selected for this garment type. If templates have been selected for the finish pieces, optionally, the selection 150 of the finish macro may be based also on these templates.

For instance, the library of finish macros may comprise user-generated finish macros that are generated and uploaded by a user of the software. For instance, such user-generated finish macros may be generated in a garment finish preset generation process as, e.g., described with respect to FIGS. 6 to 14.

The 3D assembled shape pieces are then visualized 160 on an avatar in a graphical user interface (GUI) as a preliminary 3D garment. The preliminary 3D garment may also comprise the finishes being assembled according to the selected macros. Optionally, the avatar or parts thereof may be transparent or invisible—for instance, a user may be allowed to select the level of transparency.

Figure 23:
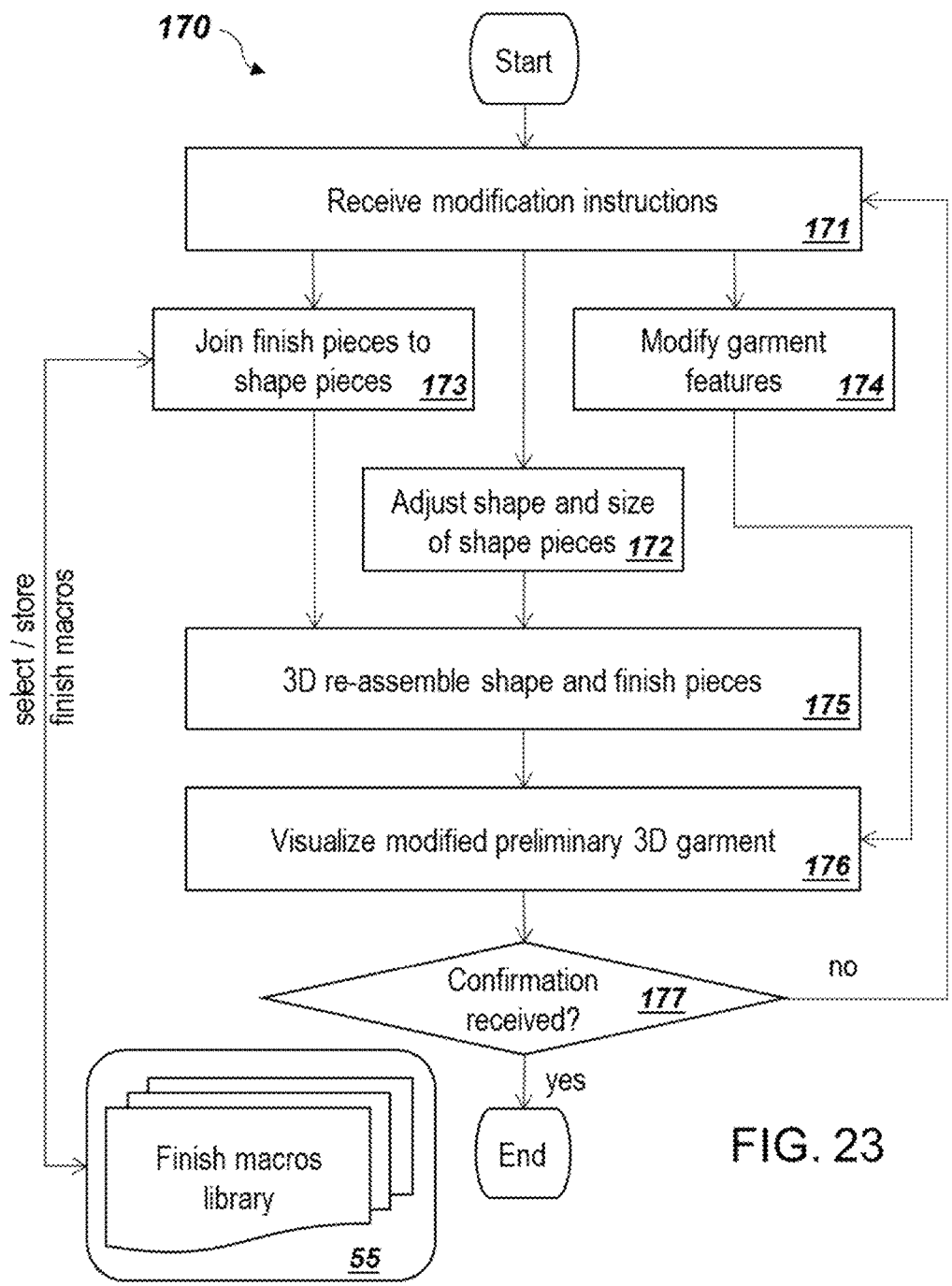
FIG. 23 illustrates an exemplary garment adjustment process as part of the method of FIG. 21.

A garment adjustment process 170 is performed that allows a user to use the GUI to generate a user-generated garment based on the visualized preliminary 3D garment. An example of such a garment adjustment process 170 is illustrated in FIG. 23. If the automated 3D assembling process did not get some detail correct or if the recognition algorithm incorrectly identified some of the pattern pieces, the garment adjustment process 170 also allows the user to quickly provide the missing information and make any needed corrections.

Once the garment adjustment process 170 is finished, fabrication instructions are automatically generated 180 that allow producing the user-generated garment. For instance, the fabrication instructions may comprise user-generated garment piece data related to shapes and sizes of 2D garment pieces of the user-generated garment, positioning data related to the relative positions of the plurality of 2D garment pieces of the user-generated garment, and sewing instructions for sewing together the plurality of 2D garment pieces of the user-generated garment, including sewing instructions for sewing together shape and finish pieces. The fabrication instructions typically may comprise further information regarding the garment, for instance including a fabric type, a trim type or a stitch type. The fabrication instructions may be generated to be computer-readable, human-readable or both.

In the case of computer-readable instructions, these may be provided to one or more garment fabrication machines, so that these machines may produce the user-generated garment based on the fabrication instructions. Providing computer-readable instructions to machines may comprise sending one or more data files via the internet to a remote factory. Alternatively, the computer system on which the method is executed may be connected directly to the machines producing the garment.

In the case of human-readable instructions, these may be provided to one or more garment producers, who then produce the user-generated garment based on the fabrication instructions, e.g. by programming or controlling one or more garment fabrication machines. For instance, the human-readable instructions may comprise a "Tech Pack" as illustrated in FIG. 4. Especially if the user who generates the garment (i.e. the designer) is also the garment producer, providing the human-readable instructions may include displaying them on the same display as the GUI. Otherwise, providing the human-readable instructions may comprise printing the instructions on paper or generating an Excel spread sheet, a PDF file or similar data comprising the "Tech Pack".

In some embodiments, the method 100 also comprises the steps of providing the fabrication instructions and producing the garment based on the fabrication instructions.

Figure 22:
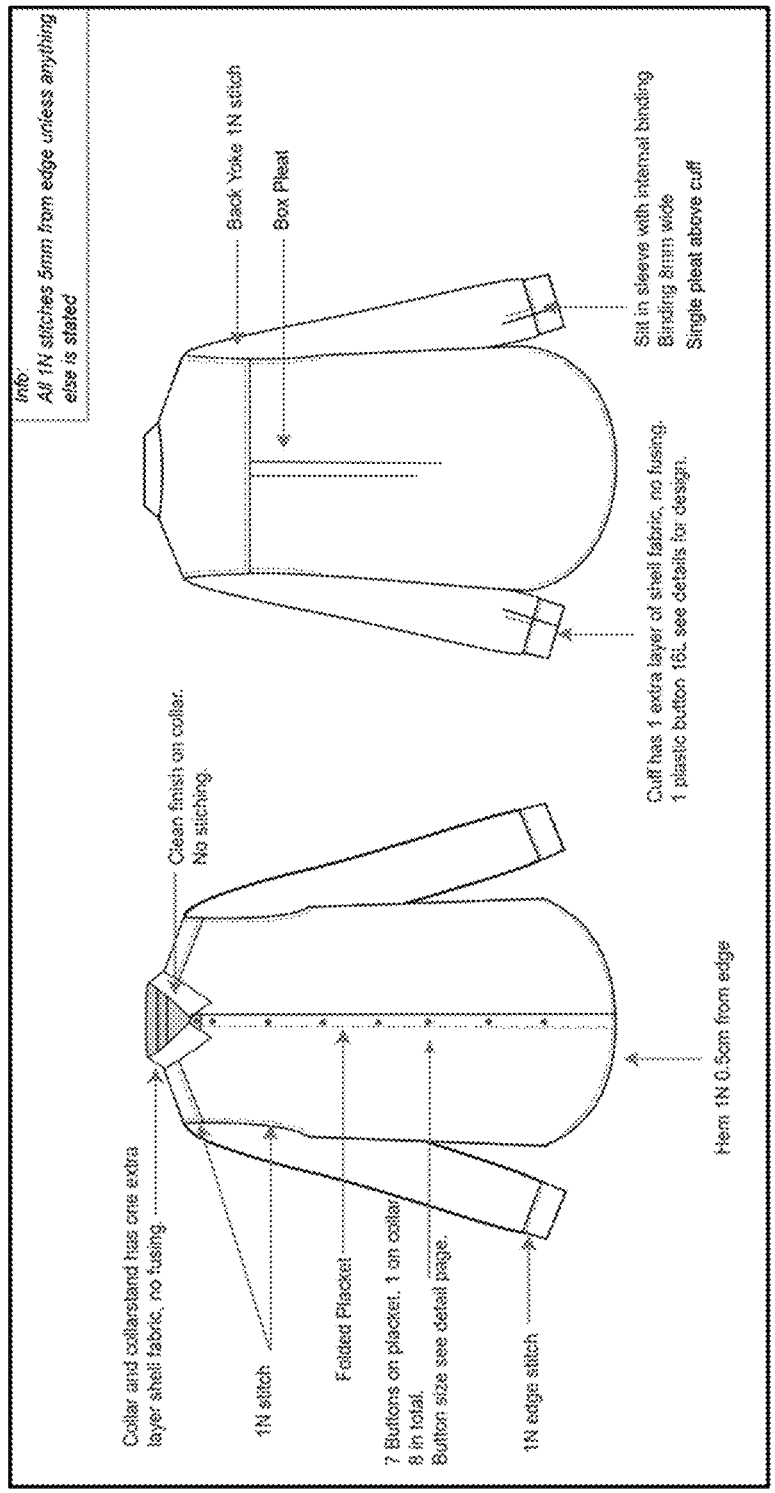
FIG. 22 shows an example of a user-readable document from which computer-readable information can be extracted with the method of FIG. 21.

FIG. 22 shows an example for human-readable instructions as part of the garment data. The user may load such a human-readable document that describes the garment as part of a "Tech Pack" file. This document is automatically searched for important details like the construction details and the bill of materials (the fabric, trims etc. that make up the garment). In addition, the document may be searched for the color way details and the size chart. The text from these items is fed into a trained expert system that understands industry jargon and converts it into digital, i.e. computer-readable, information that can then be used for 3D assembling the preliminary garment. In the shown example of human-readable instructions for fabricating a shirt, this means that, for instance, the single needle stitch arrow would be applied to the same stitches in the 3D garment, that seven buttons would be applied on the placket and one button would be applied on the collar, and that a box pleat would be added on the back of the garment. From the color way section the different colors, in which the garment should be produced in, can be extracted, so that automatically different digital garments can be created.

FIG. 23 is a flowchart illustrating an exemplary garment adjustment process 170, e.g. as a part of the method of FIG. 21. Some or all steps of the method may be performed automatically in a computer system. After the start of the process, the system awaits user input via the GUI in order to receive 171 modification instructions for modifying the visualized garment. In particular, the user's modification instructions may relate to adjusting 172 a 2D shape and/or a size of one or more of the shape pieces, or to joining 173 at least one finish piece to one or more shape pieces. In this case, the garment adjustment process comprises 3D re-assembling 175 the shape pieces and the finish pieces. The user's modification instructions may also relate to modifying 174 certain garment features of one or more of the 2D garment pieces, for instance a fabric or color.

The modified preliminary 3D garment is then visualized 176—preferably in real time—on the avatar in the GUI. If the user confirms 177 that the modifications are complete, the garment adjustment process 170 ends, and the fabrication instructions for this user-generated garment can be generated. Otherwise, the process continues with awaiting further user input with modification instructions. This can be iterated until the user is content and confirms the modifications.

In some embodiments, the user, who wishes to join finish pieces to shape pieces, may select a finish macro from a library 55 of finish macros. In some embodiments, the user, who has defined how to join a finish piece to one or more shape pieces, may store this definition as a finish macro in the library 55 of finish macros. Optionally, a user may select a finish macro, adapt it and then store the adapted finish macro in the library 55. For instance, finish macros may be selected in a garment finish preset retrieval described and application process as, e.g., with respect to FIGS. 15 to 20. User-generated finish macros may be generated in a garment finish preset generation process as, e.g., described with respect to FIGS. 6 to 14.

Figure 24:
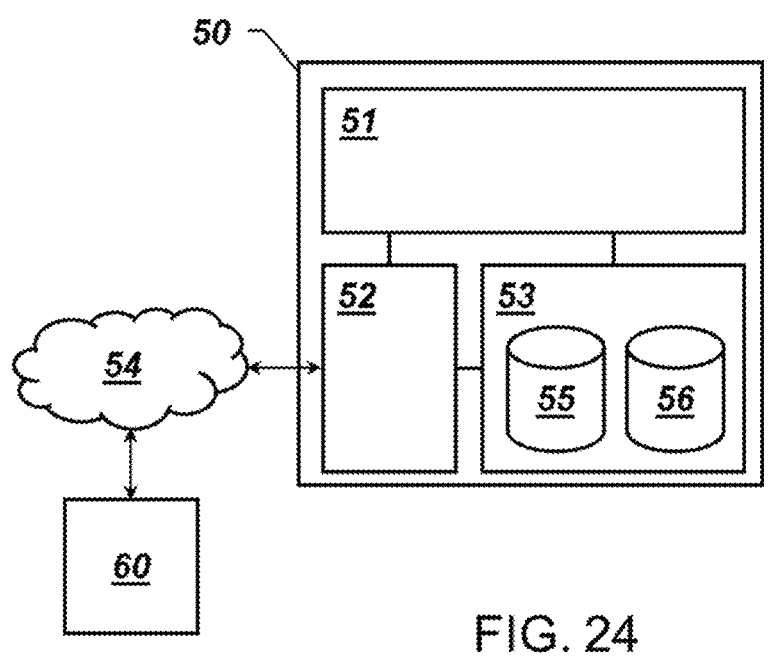
FIG. 24 shows an example of a computing system for performing the method of FIG. 21.

FIG. 24 shows an exemplary server computer 50 that is configured for performing embodiments of the method according to the invention, for instance the method of FIG. 21. The depicted server computer 50 comprises a processor 51, a communication unit 52 and a memory 53 that are operatively coupled with each other.

The communication unit 52 is configured to establish remote data connections via the Internet 54, e.g. with a client device 60 of a user controlling a garment adjustment process. The data connections allow uploading and downloading data from and to the memory 53.

The memory 53 has stored a software (computer program product) with program code for performing the method or parts thereof when executed. The memory has also stored a finish macro library 55 comprising a plurality of finish macros and a template library 56 comprising a set of templates that assign consistent identifiers to segments of the shape pieces and comprise information about a position and orientation of the shape pieces relative to a human body. The memory 53 may also have stored an application software program ("app") that can be downloaded via the internet, installed and executed on a client device of the user (not shown here).

The client device 60 comprises means for establishing a remote data connection with the server computer 50 via the Internet 54, input means (e.g. a mouse, touchscreen etc.) and a display unit. The display unit allows displaying a GUI to the user, wherein the preliminary 3D garment is visualized on an avatar in the GUI and the user is allowed to control the garment adjustment process using the GUI and the input means. Optionally, the client device 60 may comprise a processor and a memory and may be configured to perform some or all of the method steps on its own. For instance, an app may be installed on the client device 60 that has been downloaded from the server 50. Also, local libraries may be provided in the memory of the client device, comprising finish macros and templates.

Although the invention is illustrated above, partly with reference to some preferred embodiments, it must be understood that numerous modifications and combinations of different features of the embodiments can be made. All of these modifications lie within the scope of the appended claims.

What is claimed is:

1. A computer-implemented method for fabricating a user-generated garment, the garment comprising one or more finishes, the method comprising, automatically in a computer system:

receiving garment data related to a predefined or default garment, the garment data comprising garment piece data related to a plurality of 2D garment pieces, from which the predefined or default garment is assembled, identifying, by a trained recognition algorithm of the computer system and based on the garment data, a piece type of each of the plurality of 2D garment pieces, wherein the plurality of 2D garment pieces comprising shape pieces and finish pieces, wherein the shape pieces are flat fabric pieces, together providing an overall shape of the garment when assembled, and the finish pieces comprise at least a subset of cuffs, plackets, flies, pockets, waistbands and collars;

selecting, from a set of templates and based on the identified piece type, a template for each shape piece, the template assigning consistent identifiers to segments of the respective shape piece, and comprising information about a position and orientation of the respective shape piece relative to a human body;

3D assembling the shape pieces using iterative proximity and the information about the position and orientation;

selecting, for each of the finish pieces and based on the garment piece data, a finish macro from a library of finish macros, the finish macro comprising assembling instructions for assembling the respective finish piece to one or more 3D assembled shape pieces;

visualizing, on an avatar in a graphical user interface, at least the assembled shape pieces as a preliminary 3D garment;

performing a garment adjustment process that allows a user to generate a user-generated garment based on the preliminary 3D garment using the graphical user interface; and generating fabrication instructions for fabricating the user-generated garment.

2. The method according to claim 1, wherein the garment adjustment process comprises:
receiving, via the graphical user interface, user input with modification instructions to modify the preliminary 3D garment;
modifying the preliminary 3D garment based on the modification instructions; and
visualizing the modified preliminary 3D garment as the user-generated garment on the avatar.

3. The method according to claim 2, wherein modifying the preliminary 3D garment comprises:
adjusting a 2D shape and/or a size of one or more of the shape pieces,
joining at least one finish piece to one or more shape pieces, and
3D re-assembling of the shape pieces and finish pieces.

4. The method according to claim 3, wherein:
the modification instructions comprise a user-selection of a finish macro from the library of finish macros or from a subset of the finish macros in the library; and
joining the at least one finish piece to one or more shape pieces comprises assembling the finish to one or more 3D assembled shape pieces according to the assembling instructions of the user-selected macro.

5. The method according to claim 2, wherein:
the modification instructions also relate to garment feature modifications, and
modifying the preliminary 3D garment based on the modification instructions comprises modifying garment features of at least one 2D garment piece, the garment features comprising a least a fabric.

6. The method according to claim 2, wherein the shape modifications comprise changing a garment size, and adjusting the one or more shape pieces based on the modification instructions comprises adjusting a plurality of garment pieces based on the changed garment size.

7. The method according to claim 2, wherein the garment adjustment process is an iterative garment adjustment process, wherein at least the steps of receiving the input and modifying the preliminary 3D garment are performed iteratively.

8. The method according to claim 7, wherein at least the steps of receiving the input, modifying the preliminary 3D garment and visualizing the modified preliminary 3D garment are performed iteratively until a user confirmation is received via the graphical user interface, wherein the user confirmation confirms that:
the modified preliminary 3D garment is the user-generated garment to be fabricated; and/or
that fabrication instructions should be generated based on the modified preliminary 3D garment that is visualized on the avatar.

9. The method according to claim 1, wherein the garment adjustment process comprises:
receiving, via the graphical user interface, user input for assembling one of the finish pieces to one or more shape pieces; and
3D assembling of the finish piece according to the user input, wherein the method further comprises:
generating, based on the user input, a new finish macro; and
storing the new finish macro in the library.

10. The method according to claim 1, wherein the garment data comprises a garment type identifier identifying a garment type of the predefined or default garment, and 3D assembling the shape pieces is based also on the garment type.

11. The method according to claim 10, wherein the garment type defines:
areas of the human body the garment is intended to cover and a plurality of openings necessary to accommodate body parts; or
relative positions of a set of shape pieces and a plurality of openings resulting from these relative positions,
wherein the body parts include at least one of arms, legs and neck.

12. The method according to claim 10, wherein a list comprising a plurality of garment type identifiers for a plurality of different garment types is provided to the user, and the garment type identifier is selected from the list by the user.

13. The method according to claim 1, wherein a template is selected also for each finish piece from the set of templates and based on the identified piece type, the template assigning consistent identifiers to segments of the respective finish piece.

14. The method according to claim 1, wherein the segments comprise at least one of seams and sewing edges.

15. The method according to claim 1, wherein selecting the finish macros is based on the garment piece data and on a user-selected default.

16. The method according to claim 1, wherein receiving the garment data comprises loading a file into a memory of the computer system, wherein the file:
is loaded into the memory upon receiving a respective user input; and/or
is one of a 2D CAD file and a DXF file.

17. The method according to claim 1, wherein the graphical user interface provides a plurality of modification instructions as user-selectable commands, the user-selectable commands relating to at least one of:
folding a 2D garment piece,
placing a 2D garment piece next to another 2D garment piece,
sewing 2D garment pieces together,
cutting a 2D garment piece, and
adding pleats to a 2D garment piece.

18. The method according to claim 1, further comprising assigning one or more garment features to each of the 2D shape pieces, the garment features comprising a least a fabric, wherein the assembled shape pieces are visualized on the avatar in the graphical user interface as the preliminary 3D garment having the assigned garment features.

19. The method according to claim 1, wherein the fabrication instructions are computer-readable instructions and the method further comprises:

providing the fabrication instructions to one or more garment fabrication machines; and fabricating, by the one or more garment fabrication machines, the user-generated garment based on the fabrication instructions.

20. The method according to claim 1, wherein the fabrication instructions are human-readable instructions and the method further comprises:

providing the fabrication instructions to one or more garment producers; and fabricating, by the one or more garment producers, the user-generated garment based on the fabrication instructions.

21. The method according to claim 1, wherein the fabrication instructions comprise:

user-generated garment piece data related to the plurality of 2D garment pieces of the user-generated garment;

positioning data related to the relative positions of the plurality of 2D garment pieces of the user-generated garment; and sewing instructions for sewing together the plurality of 2D garment pieces of the user-generated garment, wherein the plurality of 2D garment pieces of the user-generated garment comprise shape pieces and the finish pieces.

22. The method according to claim 21, wherein the fabrication instructions comprise instructions for at least one of:

fabric type;
trim type; and
stitch type.

23. The method according to claim 1, wherein the garment data comprises at least one document comprising a human-readable information describing the predefined or default garment, and the human-readable information is converted into computer-readable instructions by a trained expert system of the computer system, the human-readable information relating to at least one of:

construction details,
a bill of materials,
a colorway, and
a size chart.

24. The method according to claim 23, wherein the human-readable information is or comprises textual information; and the trained expert system analyzes the at least one document with respect to the textual information and converts the textual information into the computer-readable instructions.

25. The method according to claim 23, wherein the computer-readable instructions comprise a fully digital description of the predefined or default garment with respect to the 2D pattern pieces, the preliminary 3D garment and further properties of the predefined or default garment, including at least one of: stitches, seams, finishes, trims, and assembly instructions.

26. The method according to claim 23, wherein at least one of the following is based on the computer-readable instructions:

identifying the piece type of each of the plurality of 2D garment pieces, 3D assembling the shape pieces based, and visualizing the preliminary 3D garment.

\* \* \* \* \*